(12) United States Patent
Jeon et al.

(10) Patent No.: US 12,267,451 B2
(45) Date of Patent: Apr. 1, 2025

(54) FLEXIBLE DISPLAY DEVICE

(71) Applicant: LG ELECTRONICS INC., Seoul (KR)

(72) Inventors: Tae Hwan Jeon, Seoul (KR); Dong Uk Jeong, Seoul (KR); Byung Kil Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 18/019,515

(22) PCT Filed: Aug. 27, 2020

(86) PCT No.: PCT/KR2020/011503
§ 371 (c)(1),
(2) Date: Feb. 3, 2023

(87) PCT Pub. No.: WO2022/045397
PCT Pub. Date: Mar. 3, 2022

(65) Prior Publication Data
US 2023/0291819 A1    Sep. 14, 2023

(51) Int. Cl.
*H04M 1/02* (2006.01)
*H04R 1/02* (2006.01)
*H04R 1/34* (2006.01)

(52) U.S. Cl.
CPC ....... *H04M 1/0268* (2013.01); *H04M 1/0216* (2013.01); *H04R 1/023* (2013.01);
(Continued)

(58) Field of Classification Search
CPC ............ H04M 1/0268; H04M 1/0216; H04M 1/0283; H04M 1/035; H04M 1/0214;
(Continued)

(56) References Cited

U.S. PATENT DOCUMENTS 9,176,535 B2 * 11/2015 Bohn .................... G06F 1/1681
9,348,450 B1 * 5/2016 Kim .................... H04M 1/0268
(Continued)

FOREIGN PATENT DOCUMENTS

KR    10-2012-0034673 A    4/2012
KR    10-2017-0078431 A    7/2017
(Continued)

*Primary Examiner* — Oyesola C Ojo
(74) *Attorney, Agent, or Firm* — Birch, Stewart, Kolasch & Birch, LLP

(57) ABSTRACT

A flexible display device is disclosed. The flexible display device comprises a first body, a second body, a flexible display, and a speaker. The first body includes a deco frame, a first sound radiation unit, and a second sound radiation unit. The first sound radiation unit and the second sound radiation unit form an outlet through which the sound (sound waves) of the speaker is transmitted to the outside of the first body. The flexible display includes a first region fixed to the first body, and is provided with the second sound radiation unit while the outer surface of the border portion of the first region is spaced apart from the deco frame. The sound (sound waves) of the speaker is transmitted to the outside of the first body through the first sound radiation unit and the second sound radiation unit, such that the sound quality of the speaker can be improved, and the second sound radiation unit can be prevented from being exposed to the outside.

18 Claims, 18 Drawing Sheets

(52) U.S. Cl.
CPC ............. *H04R 1/028* (2013.01); *H04R 1/345* (2013.01); *H04R 2499/11* (2013.01); *H04R 2499/15* (2013.01)

(58) Field of Classification Search
CPC ..... H04M 1/0235; H04R 1/023; H04R 1/028; H04R 1/345; H04R 2499/11; H04R 2499/15; H04R 1/025; H04R 1/2803; H04R 1/28; H04R 1/34; G06F 1/16; G06F 1/1688; G06F 1/1624; G06F 1/1652; G09F 9/30
See application file for complete search history.

(56) References Cited

U.S. PATENT DOCUMENTS

| | | | |
|---|---|---|---|
| 9,504,170 B2* | 11/2016 | Rothkopf | H05K 5/0017 |
| 10,025,355 B2* | 7/2018 | Bohn | G06F 1/1624 |
| 11,016,530 B2* | 5/2021 | Watamura | G06F 1/1652 |
| 11,507,137 B2* | 11/2022 | Park | G06F 1/1681 |
| 11,531,378 B2* | 12/2022 | Lee | G06F 1/1681 |
| 2018/0011515 A1* | 1/2018 | Yoo | G06F 1/1681 |
| 2018/0292860 A1* | 10/2018 | Siddiqui | H04M 1/0268 |
| 2019/0018454 A1* | 1/2019 | Jung | G06F 1/1652 |
| 2019/0261519 A1* | 8/2019 | Park | G06F 1/1677 |
| 2020/0021674 A1* | 1/2020 | Cheng | H04M 1/0268 |
| 2020/0344341 A1* | 10/2020 | Lynch | H04M 1/0266 |
| 2020/0352038 A1* | 11/2020 | Kim | G06F 1/1647 |
| 2020/0371558 A1* | 11/2020 | Kim | H04M 1/0237 |

FOREIGN PATENT DOCUMENTS

| | | |
|---|---|---|
| KR | 10-2018-0040797 A | 4/2018 |
| KR | 10-2019-0086305 A | 7/2019 |
| KR | 10-2019-0101184 A | 8/2019 |
| KR | 10-2020-0100359 A | 8/2020 |
| WO | 2012/129247 A2 | 9/2012 |

* cited by examiner

[FIG. 1]
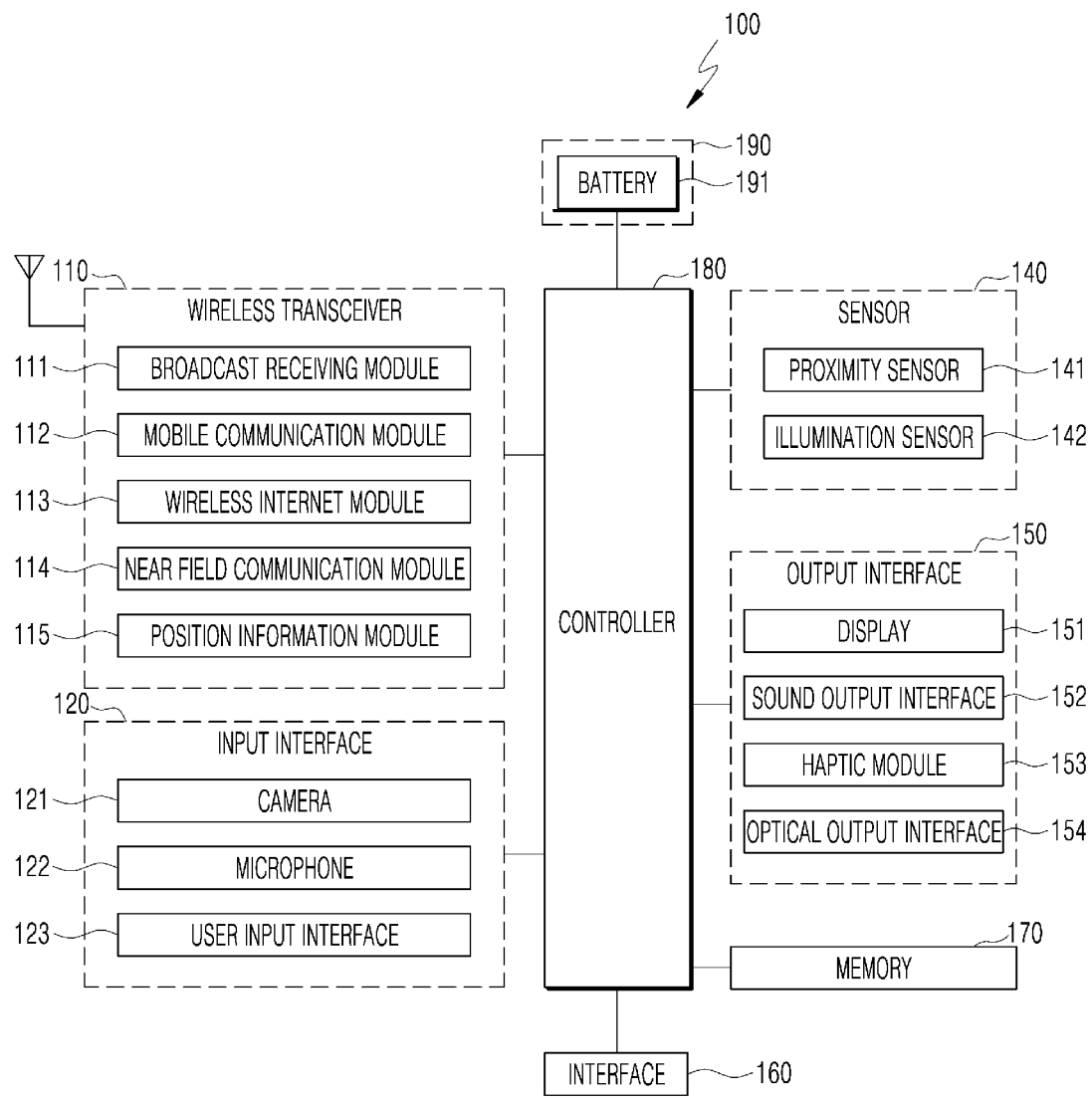

[FIG. 2a]
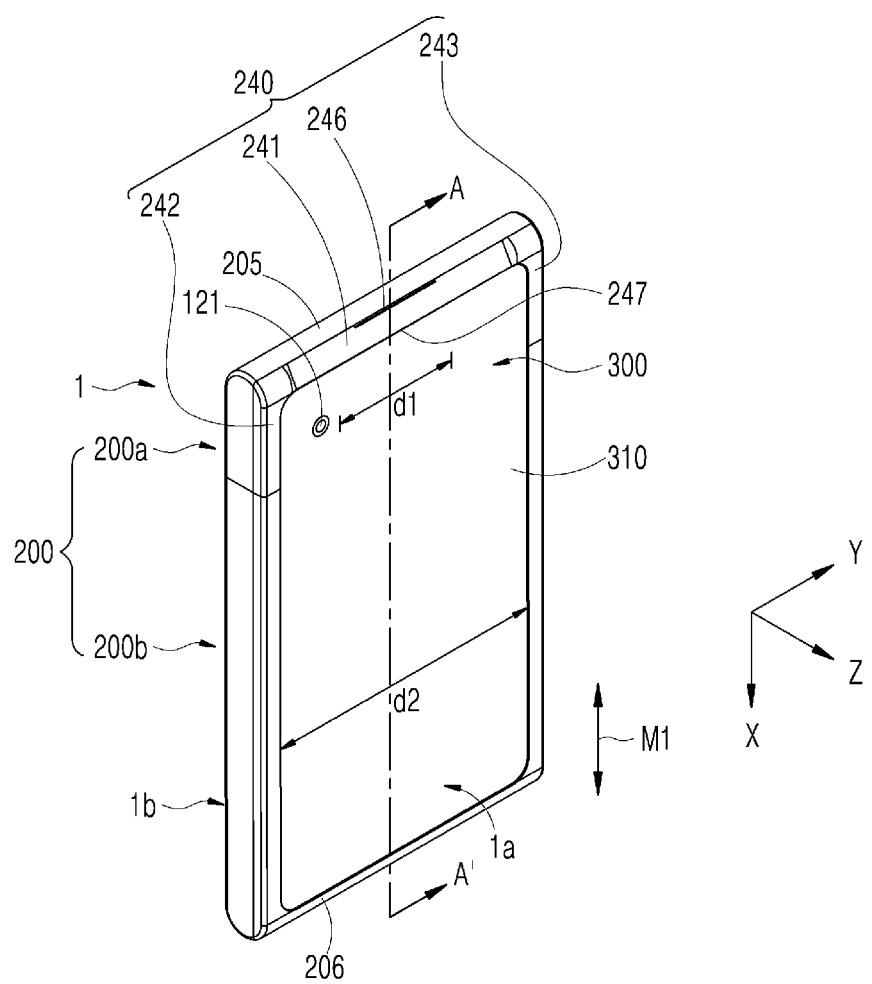

[FIG. 2b]
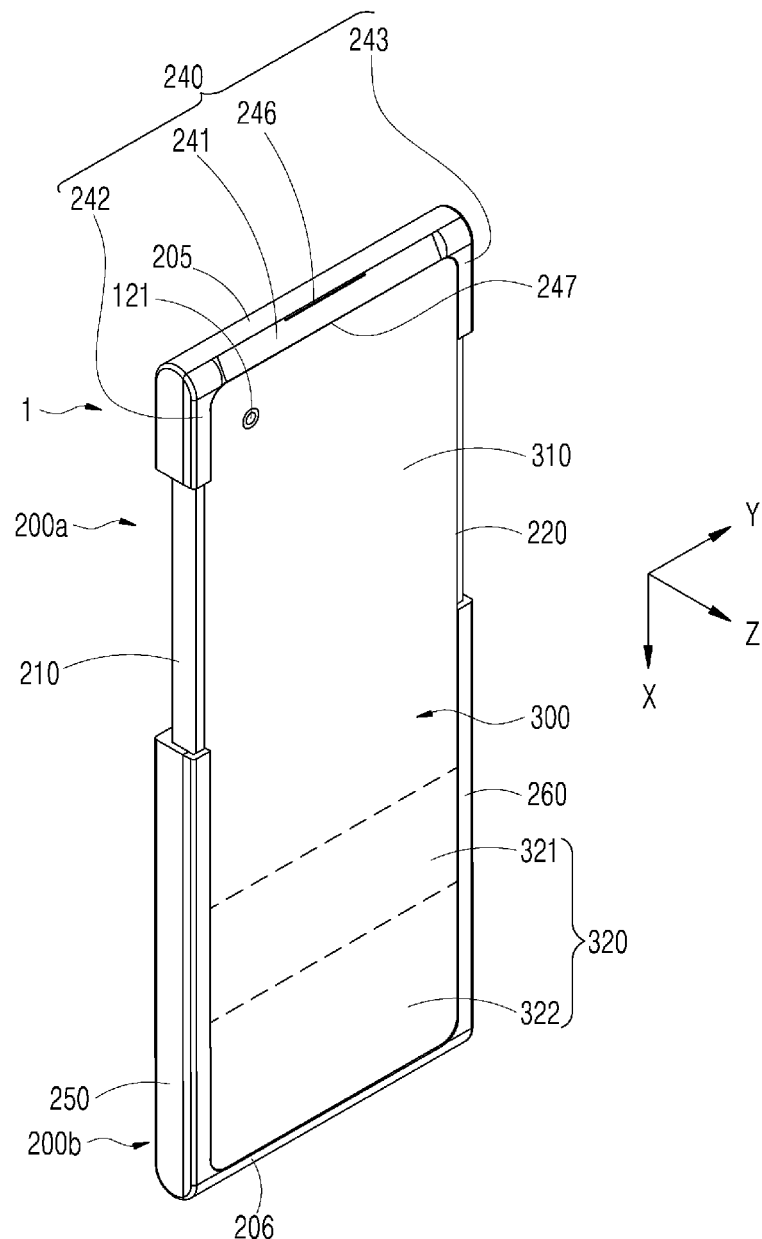

[FIG. 3a]
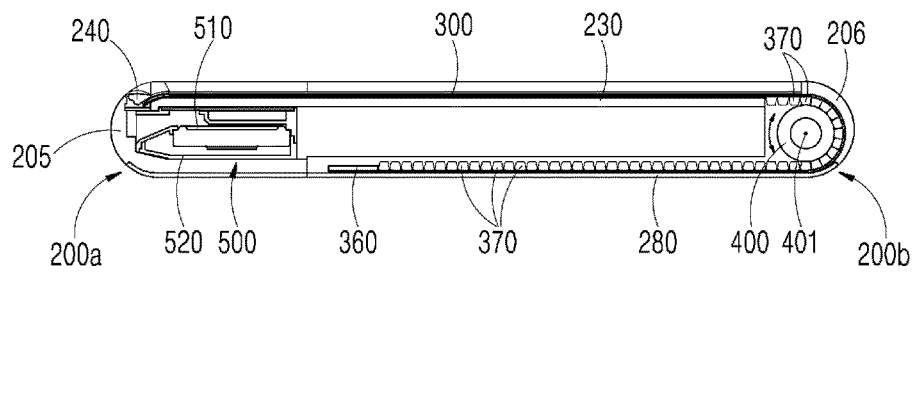
[FIG. 3b]
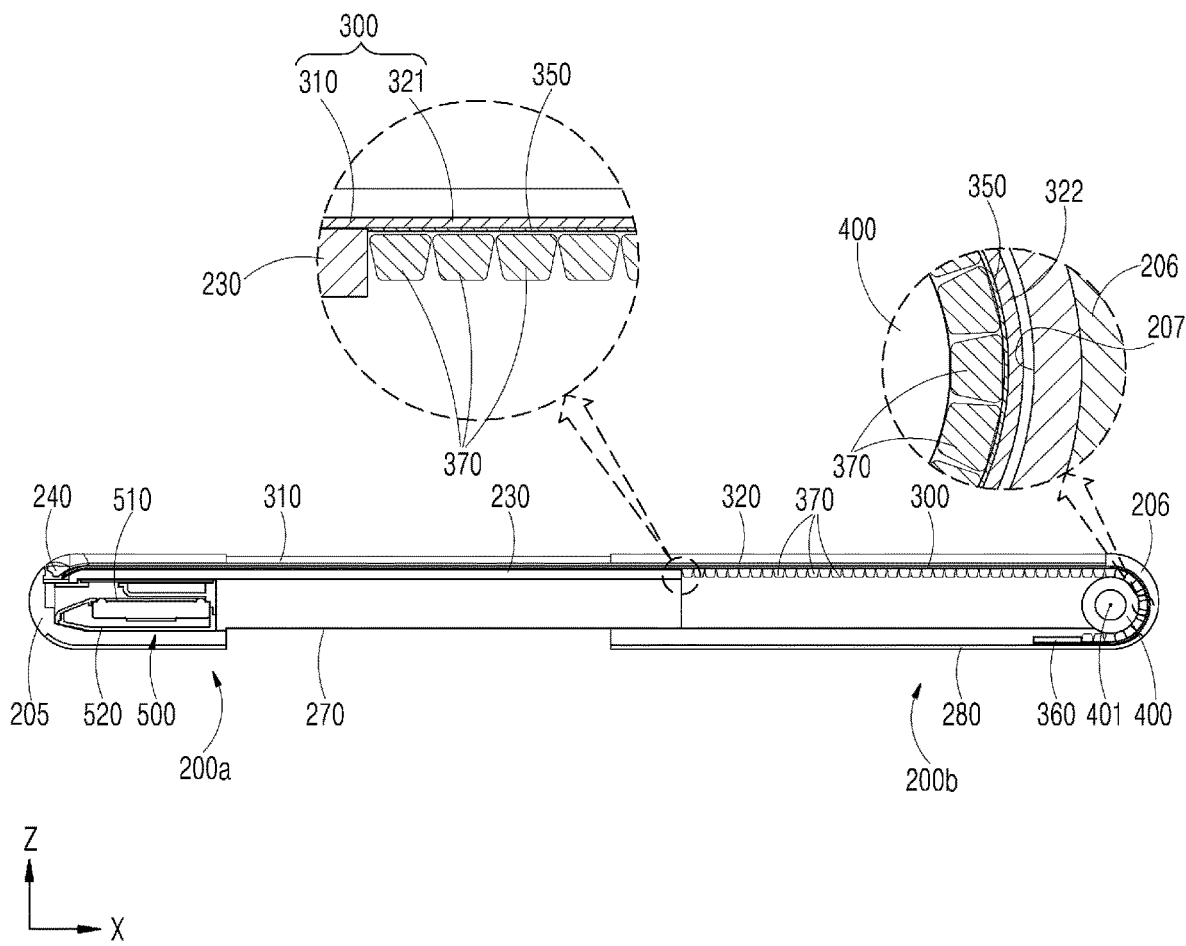

[FIG. 4a]
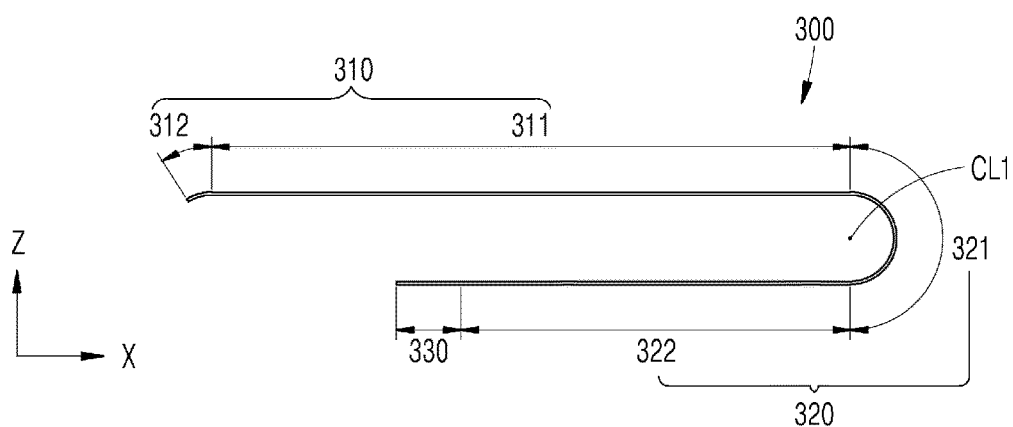
[FIG. 4b]
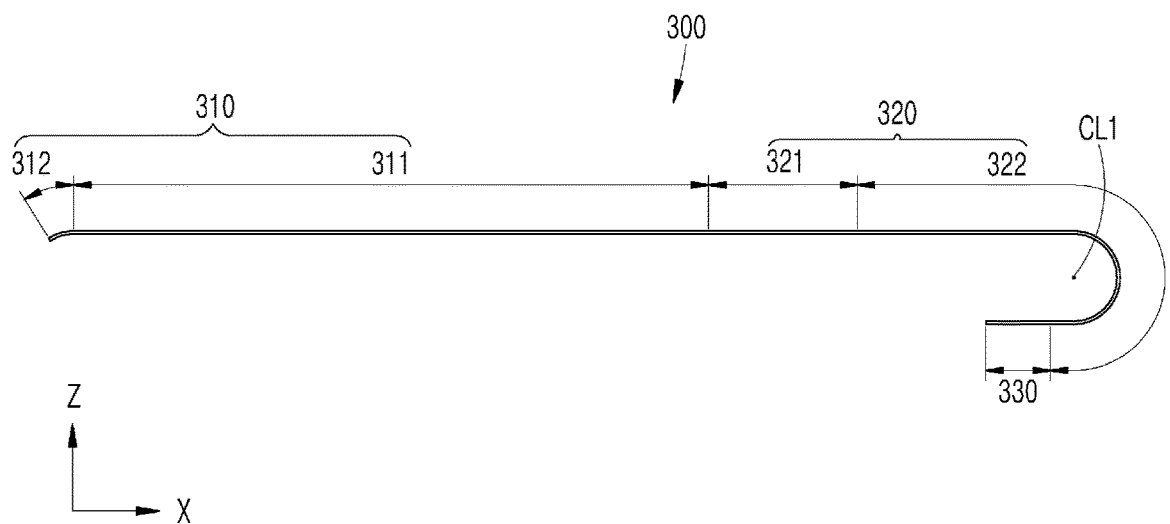

[FIG. 5a]
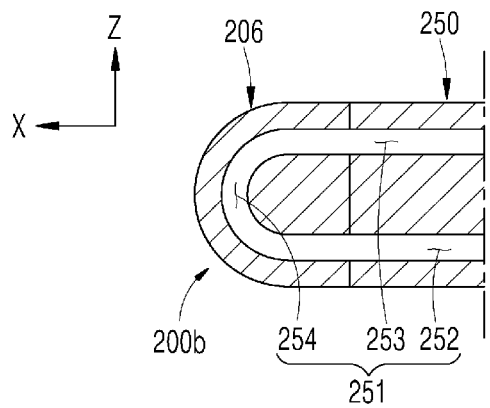
[FIG. 5b]
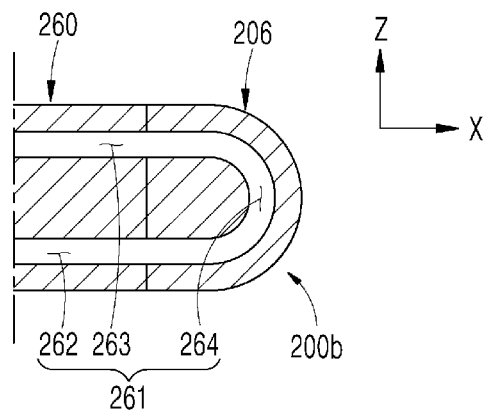
[FIG. 5c]
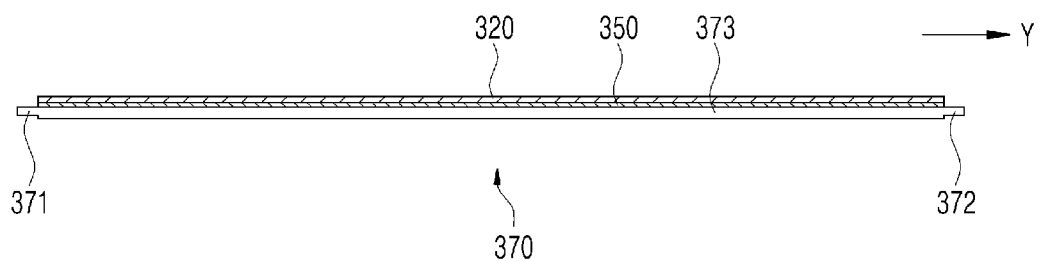

[FIG. 6a]
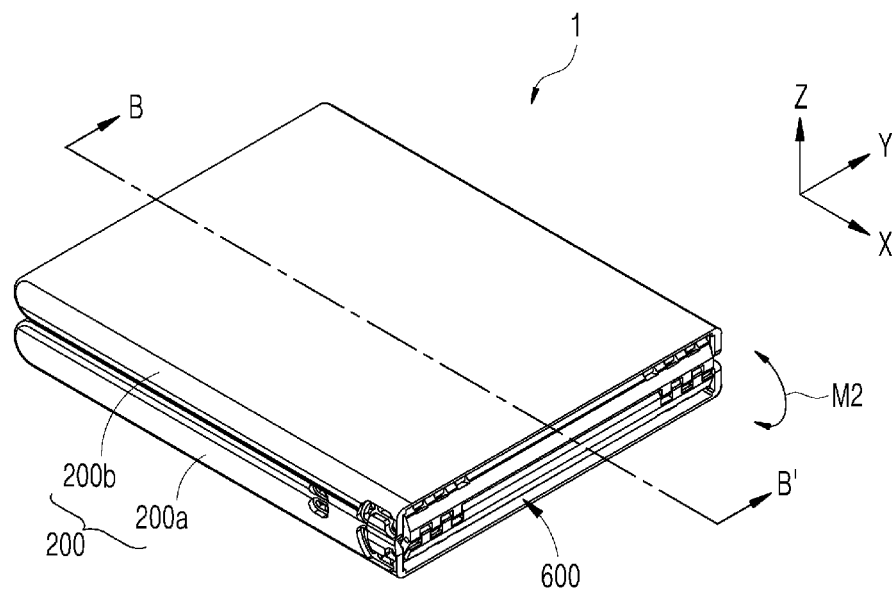
[FIG. 6b]
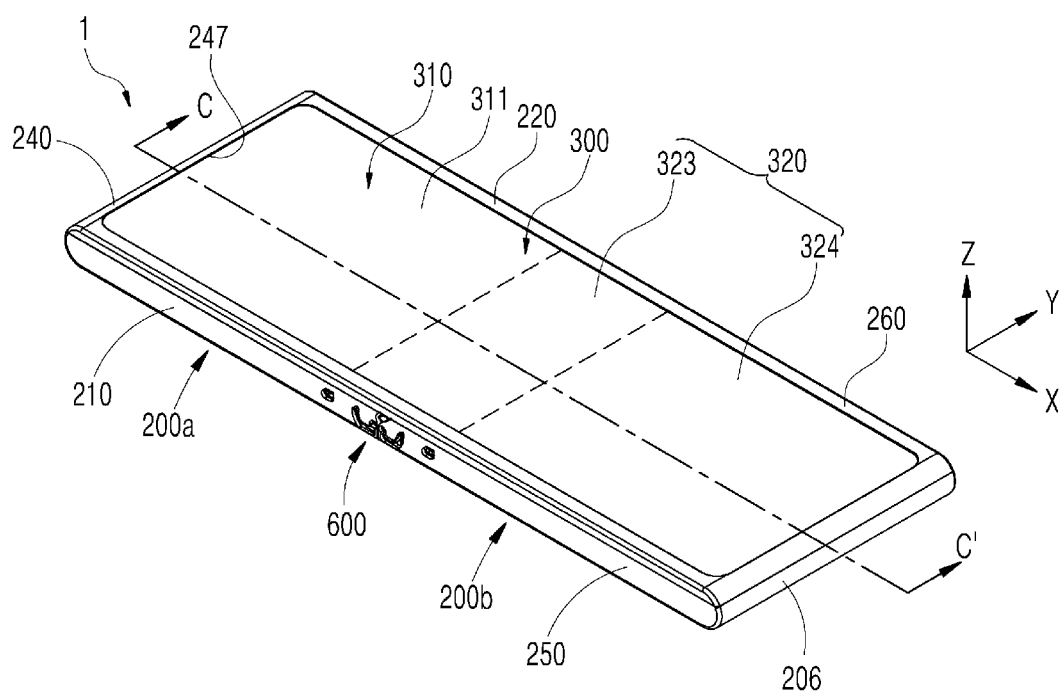

[FIG. 6c]
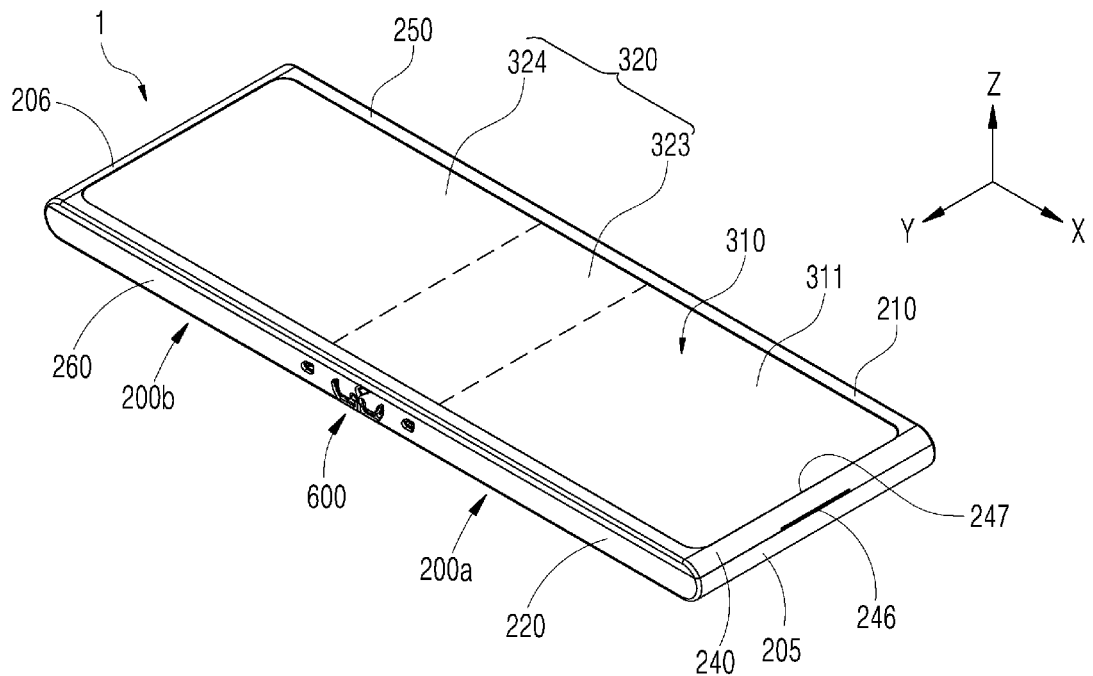
[FIG. 7a]
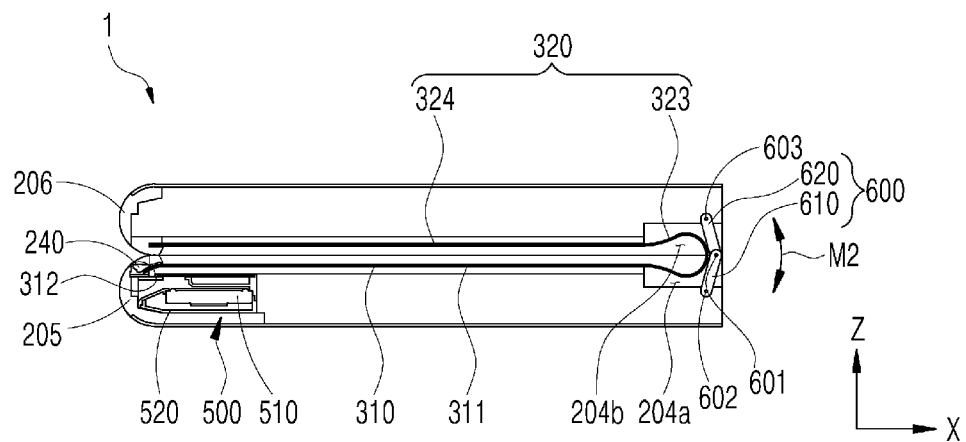

[FIG. 7b]
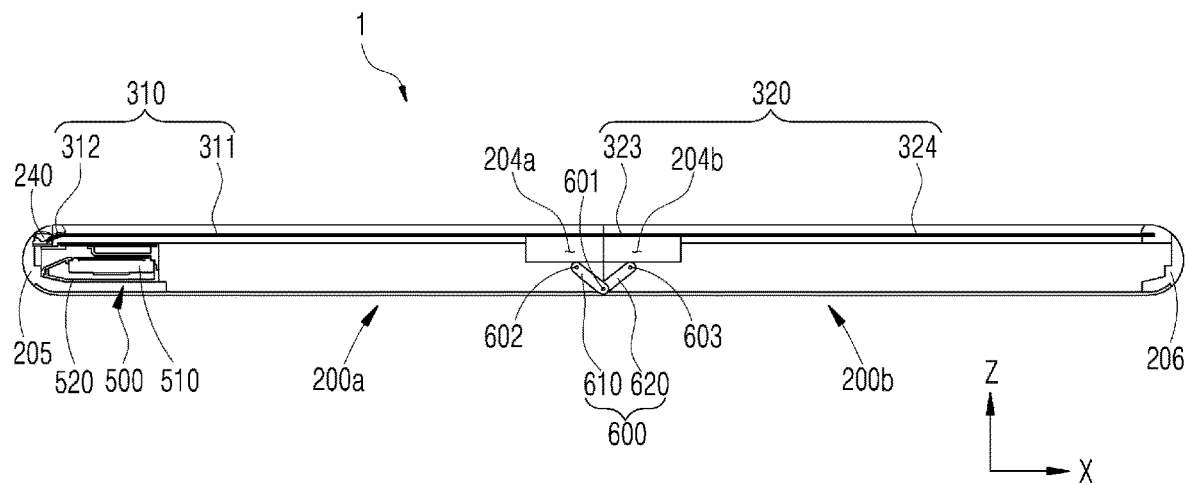

【FIG. 8a】
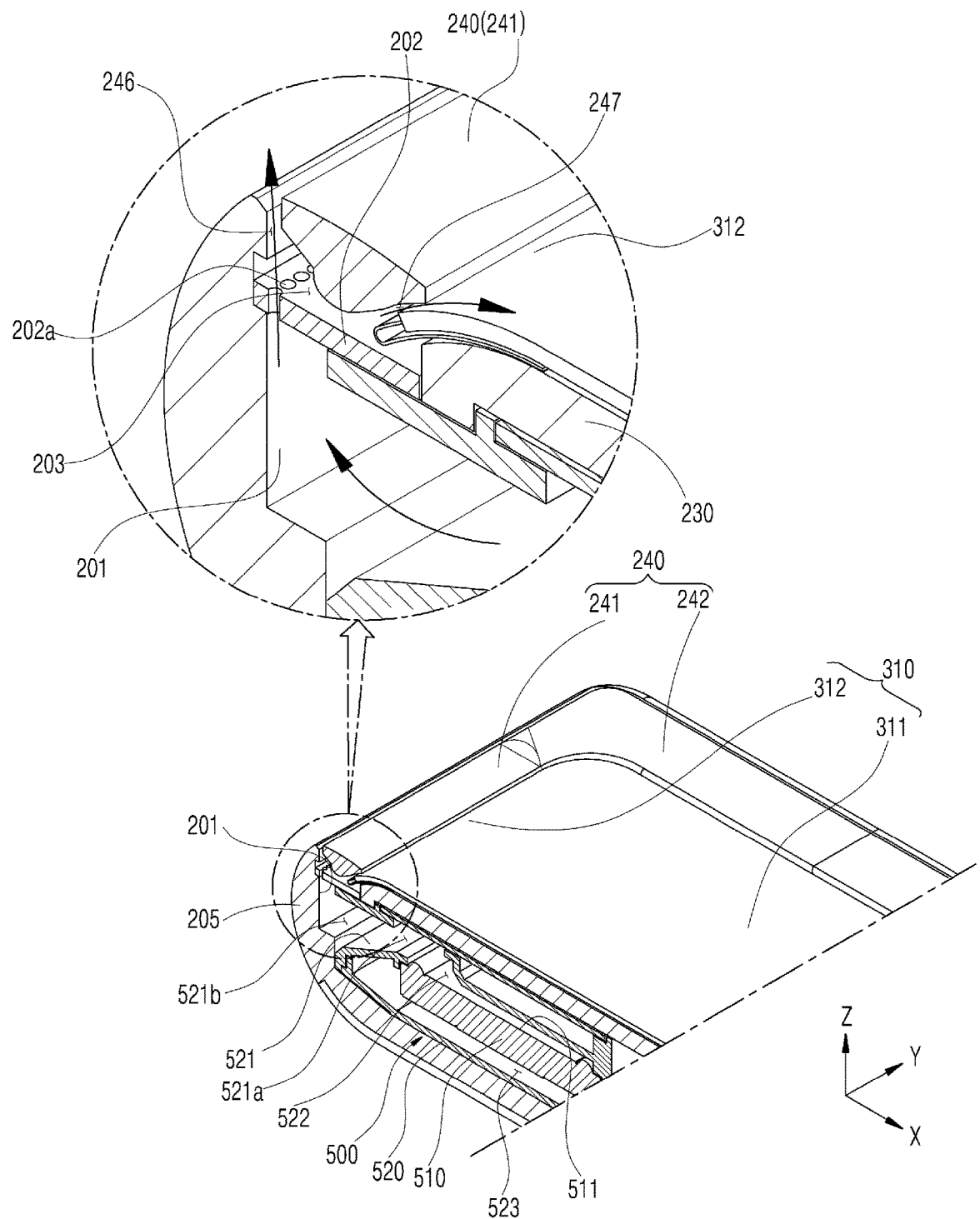

[FIG. 8b]
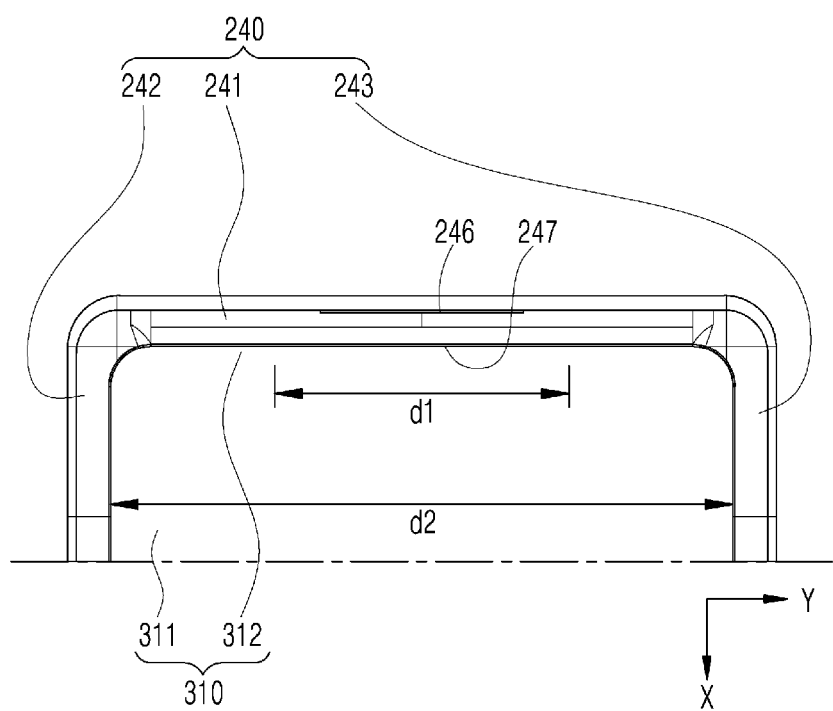

[FIG. 9a]
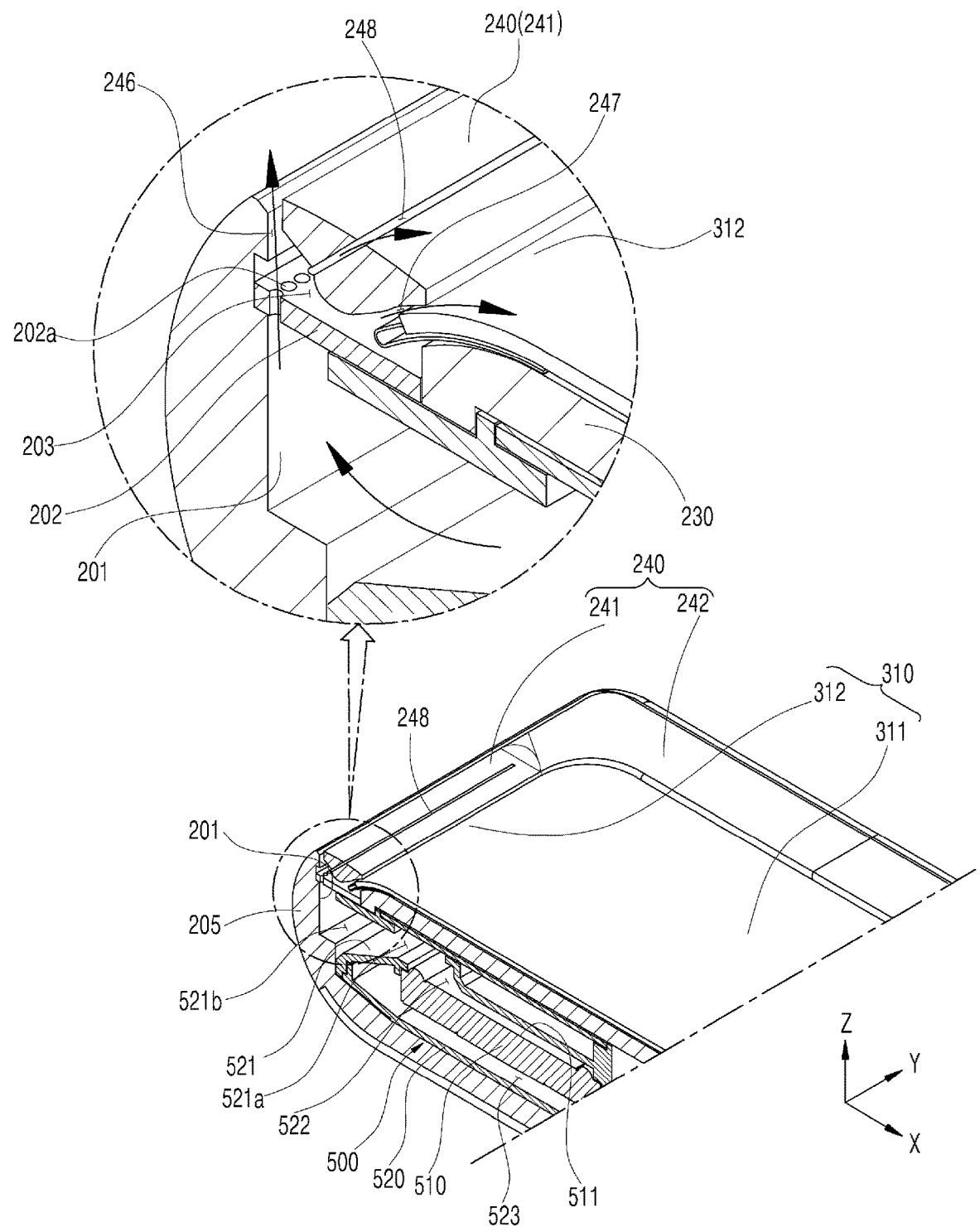

【FIG. 9b】
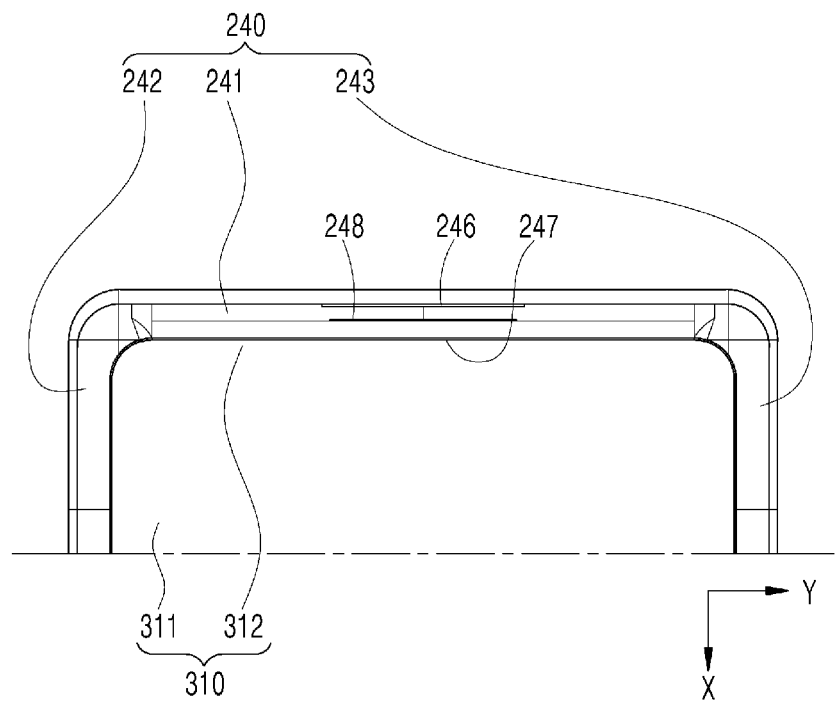
【FIG. 10】
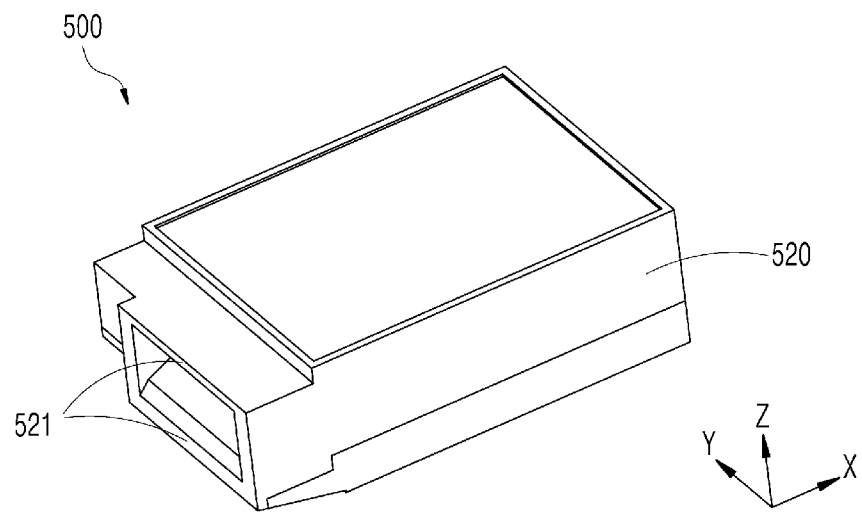

[FIG. 11]
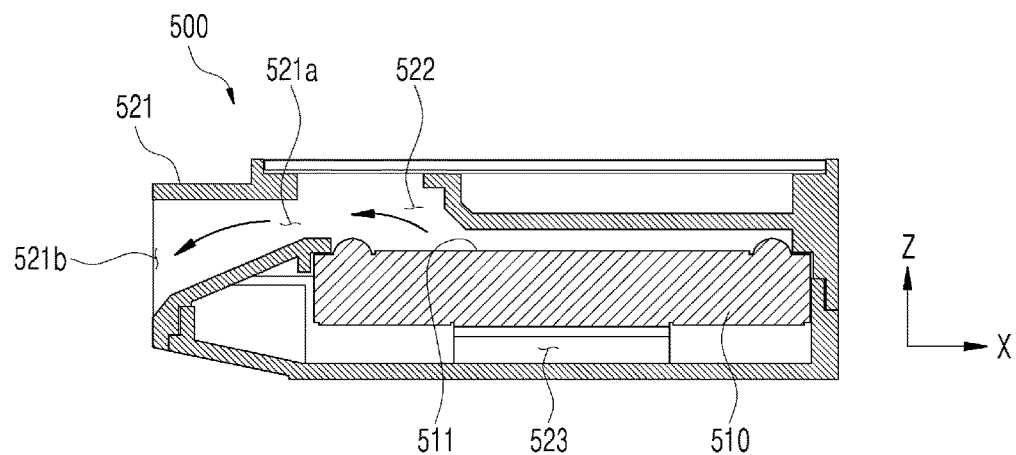
[FIG. 12]
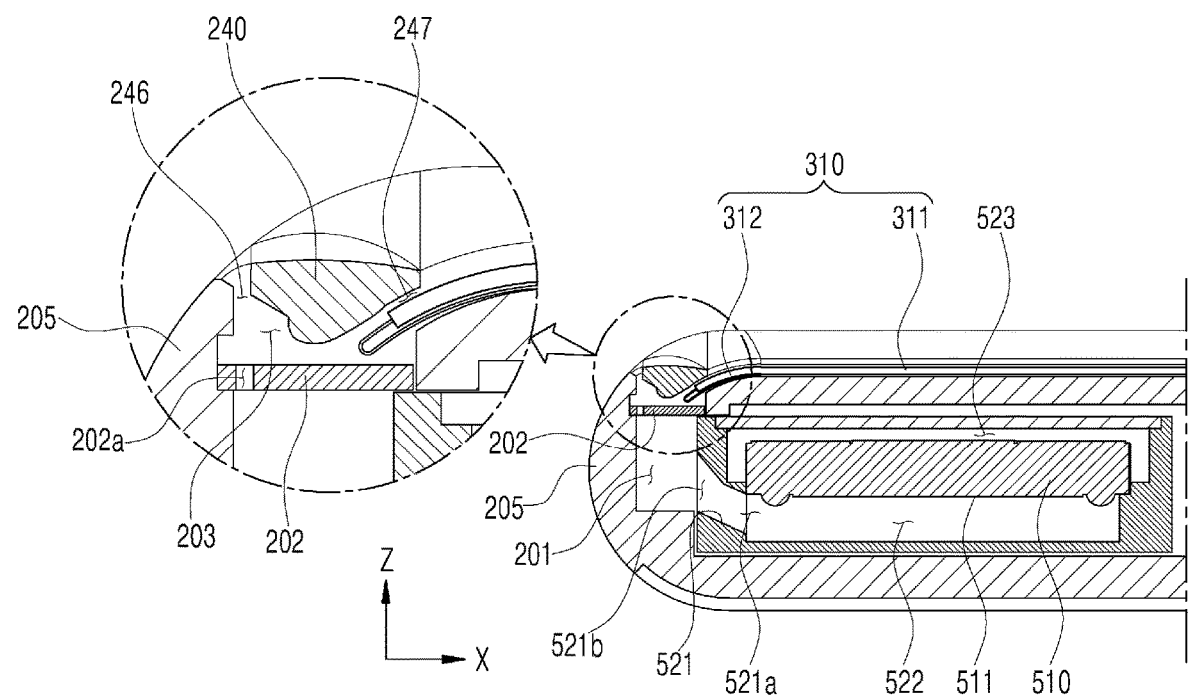

【FIG. 13】
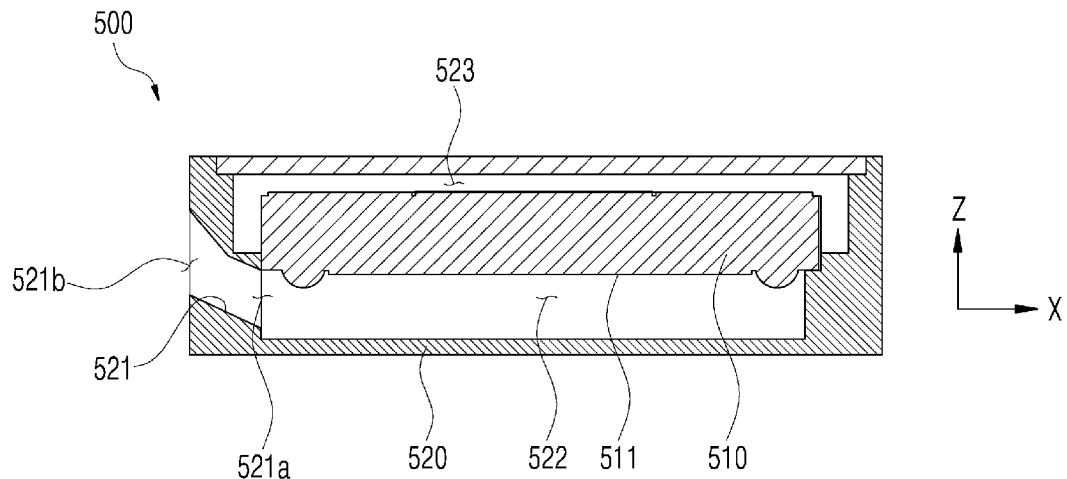
【FIG. 14a】
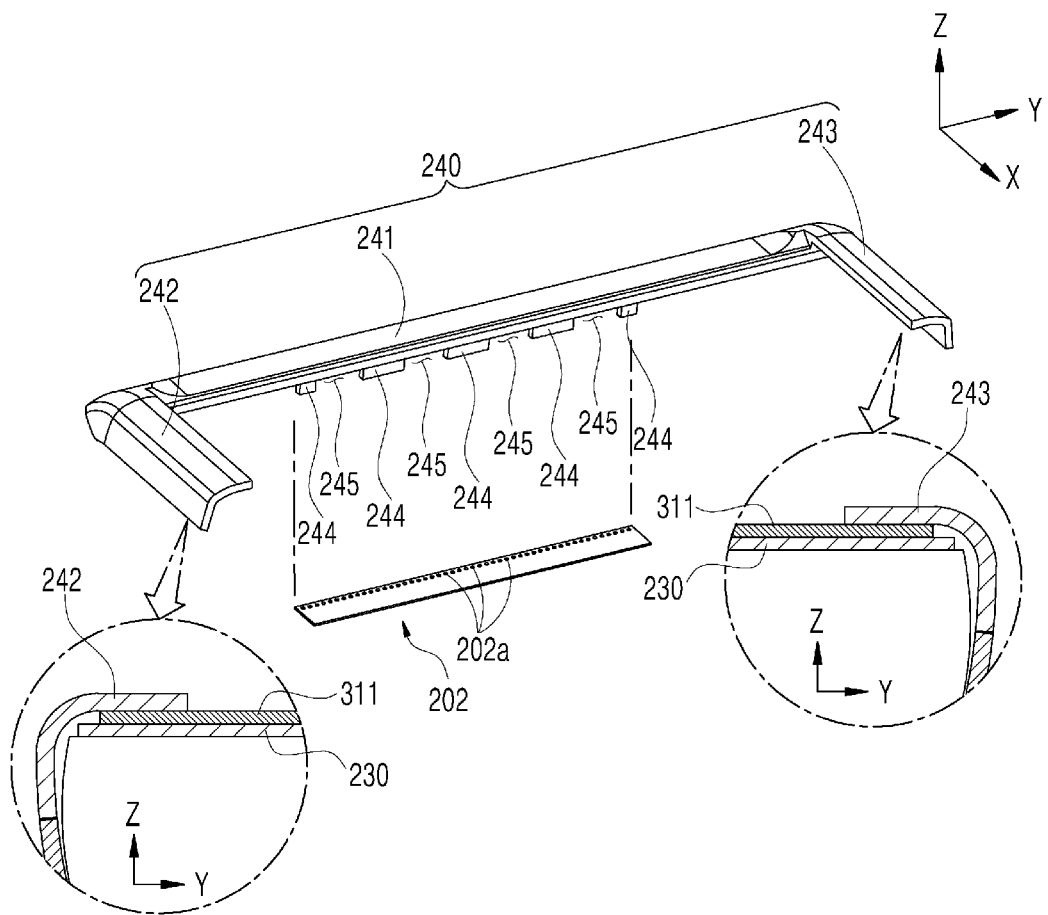

【FIG. 14b】
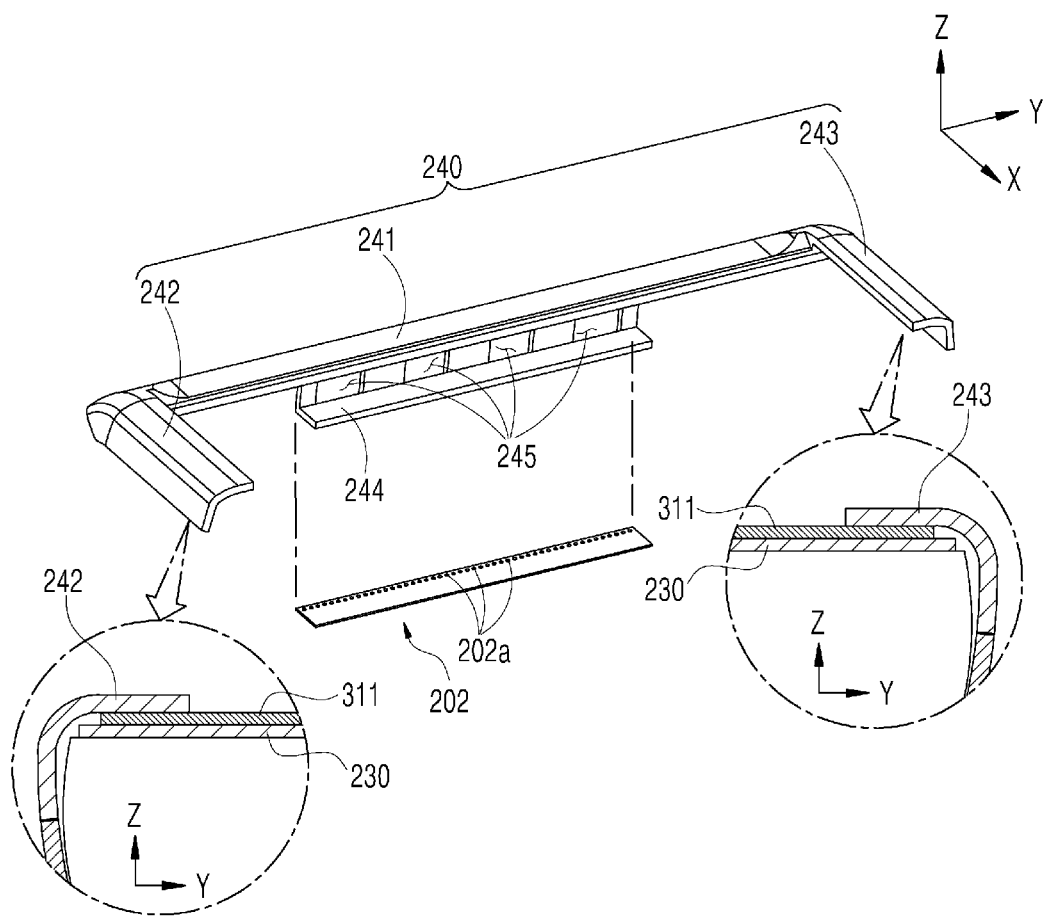

【FIG. 15a】
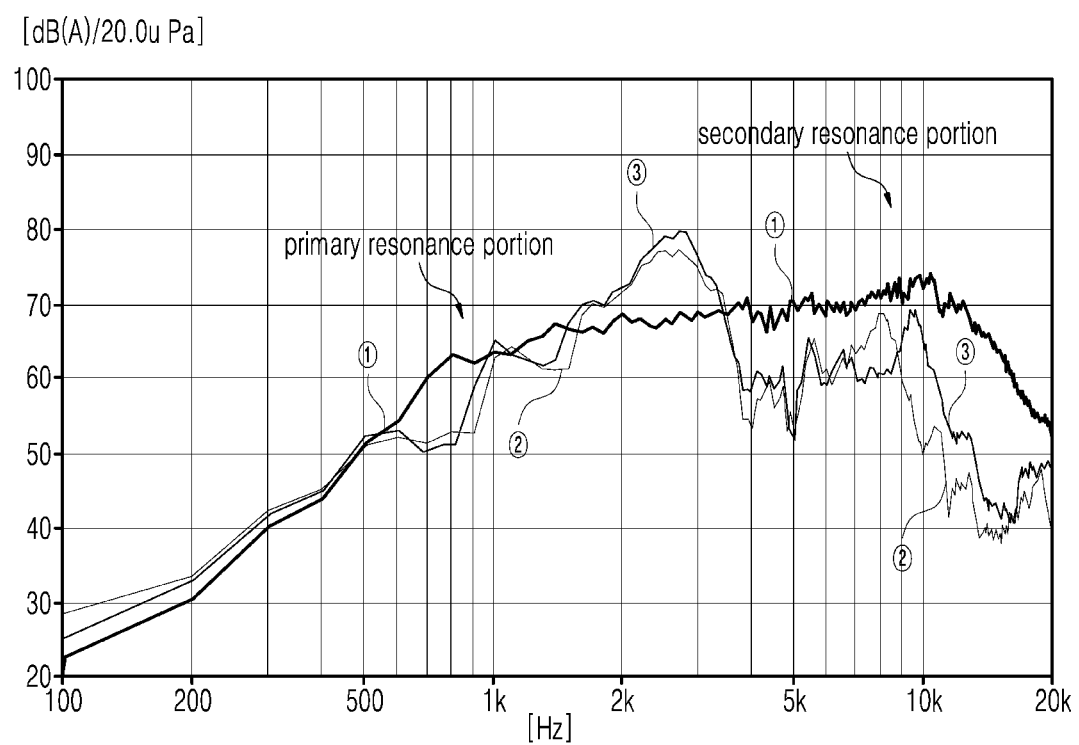

[FIG. 15b]
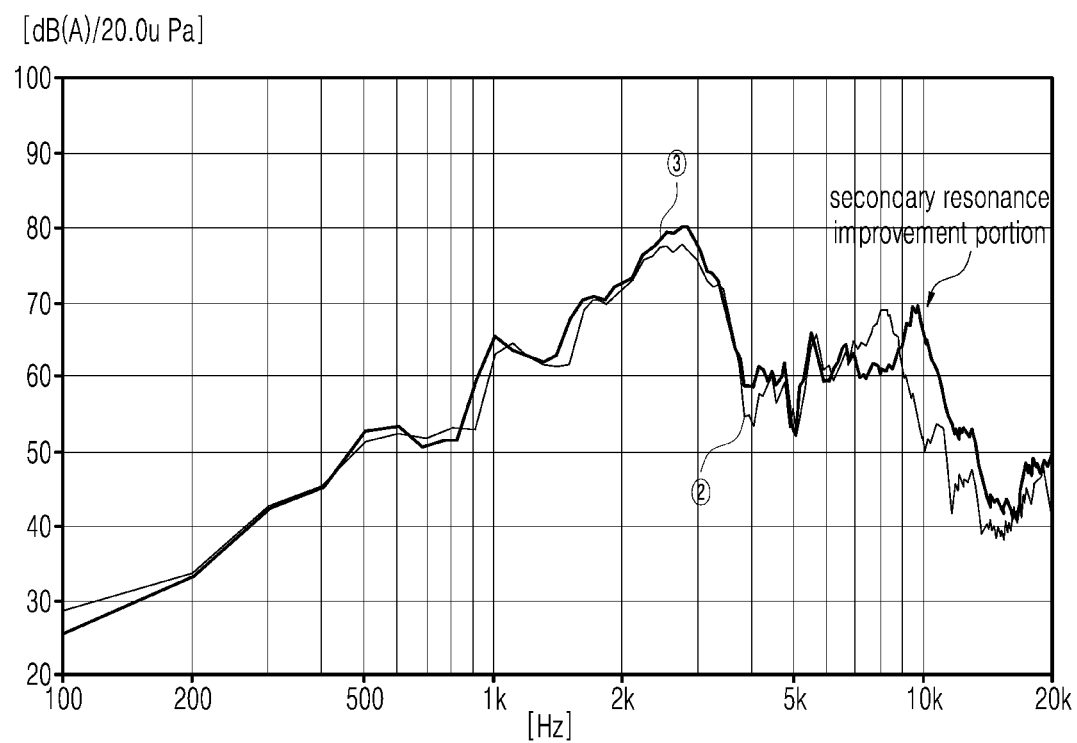

FLEXIBLE DISPLAY DEVICE

CROSS REFERENCE TO RELATED APPLICATIONS

This application is the National Phase of PCT International Application No. PCT/KR2020/011503, filed on Aug. 27, 2020, which is hereby expressly incorporated by reference into the present application.

TECHNICAL FIELD

The present disclosure relates to a device including a flexible display and a speaker and, more particularly, to a portable device including a flexible display characterized in that the size of the device is changed as two bodies move relative to each other.

BACKGROUND ART

Various devices using a flexible display that can be bent while displaying image information have been developed and introduced.

Such a flexible display has been applied to mobile terminals such as mobile phones, smart phones, etc., and users can carry such mobile terminals and use them in various places.

Representative examples of mobile devices to which a flexible display is applied are as follows.

Firstly, research and development has been underway for foldable devices having a structure in which a flexible display is applied to two bodies that are connected to each other by a folding structure (e.g., by a hinge). In such foldable devices, since the flexible display may be disposed to completely cover the two bodies and the folding structure, a relatively large-sized display can be implemented in the devices.

As another example of devices using a flexible display, rollable devices having a structure in which a display is rolled up and unrolled have been studied and developed. In such rollable devices, as the flexible display is rolled, the total size or area of the entire display can be reduced. On the contrary, as the flexible display is unrolled, the total size or area of the entire display can be increased.

As still another example of devices using a flexible display, there are devices in which as two bodies slide with respect to each other, a flexible display having a U-shape due to a curved middle portion thereof is deformed such that the surface area of the flexible display seen from one side thereof changes.

Considering the portability and convenience of the portable display device, the whole area of the display needs to be relatively large, the body part (i.e., a bezel) supporting the edge of the display needs to be relatively small, and also the device needs to be relatively thin and light.

The portable device may include a PCB, a battery, a camera, a speaker, etc.

When the speaker is provided inside the portable device, the sound (sound wave) of the speaker has to be transmitted to the outside of the portable device. To this end, a hole through which the sound of the speaker is radiated may be formed in the portable device. the hole may be formed in or adjacent to the bezel of the portable device, and the hole may be made relatively small due to the relative increase in size of the display, the need for waterproofing, and the prevention of damage to aesthetics.

However, if a hole through which sound is radiated is made small, the sound quality of the speaker may be degraded, and thus, there is need for the development of a device with a structure capable of improving the degrading.

DISCLOSURE

Technical Problem

An object to be achieved by the present invention is to provide a flexible display device that can increase an overall cross-sectional area of a hole so that the sound quality of the speaker can be improved while minimizing exposure of the hole through which a sound of the speaker is radiated to the outside of the device, in a device in which a flexible display is deformed as two bodies move relative to each other.

Another object to be achieved by the present invention is to provide a flexible display device in which a path through which the sound of the speaker is radiated to the outside of the device is divided into two or more paths, in a device in which a flexible display is deformed as two bodies move relative to each other.

Another object to be achieved by the present invention is to provide a flexible display device that can improve the sound quality of the speaker while achieving the purpose of preventing an increase in the thickness of the device and inflow of foreign substances, and the purpose of solid assembly, in a device in which a flexible display is deformed as two bodies move relative to each other.

Another object to be achieved by the present invention is to provide a flexible display device having a structure in which a flexible display is deformed as two bodies slide with each other.

Another object to be achieved by the present invention is to provide a flexible display device in which the flexible display is deformed as two bodies rotate relative to each other.

Technical Solution

According to one aspect of the subject described in the present invention, a flexible display device is configured to be carried and gripped by a user. That is, the flexible display device may have a size and weight similar to that of a typical mobile terminal.

In some embodiments, the flexible display device includes a first body, a second body, and a flexible display.

The first body and the second body are coupled to each other so as to be relatively movable.

In some embodiments, the first body and the second body may be slidably coupled to each other (hereinafter, referred to as a 'first coupling structure').

In some embodiments, the first body and the second body may be rotatably coupled to each other (hereinafter, referred to as a 'second coupling structure').

In some embodiments, the second body is configured to move parallel to the first direction relative to the first body. The second body may move in the first direction relative to the first body. The second body may move relative to the first body in a direction opposite to the first direction.

In addition, the first body may be configured to move parallel to the first direction relative to the second body. The first body may move in a direction opposite to the first direction relative to the second body. The first body may move in the first direction relative to the second body.

In some embodiments, the second body is configured to reciprocate between a first position and a second position relative to the first body.

In some embodiments, the second body may reciprocate between the first position and the second position parallel to the first direction relative to the first body.

In some embodiments, the second body may reciprocate between the first position and the second position while rotating relative to the first body.

The first position is a relative position of the second body relative to the first body, and the second position is also a relative position of the second body relative to the first body.

When the second body relative to the first body is in the first position, a state of the flexible display device refers to a first state, and when the second body relative to the first body is in the second position, a state of the flexible display device refers to a second state. Accordingly, in the description of the present invention, the 'first position' may be used in the same meaning as the 'first state of the flexible display device', and the 'second position' may be used in the same meaning as the 'second state of the flexible display device'.

The flexible display includes a first region and a second region.

The first region is coupled to the first body. The first region may be fixedly coupled to the first body.

The second region is a region extending from the first region. A direction in which the second region extends from the first region may be the first direction. The second region is coupled to the second body. When the second body moves relative to the first body, the shape of the second region is deformed.

The first region may include a main region and an edge region.

The main region is formed in a plane. The main region may be formed in parallel with the first direction and a second direction perpendicular to the first direction.

The main region may be formed to occupy a substantial part of the first region.

When the first coupling structure is applied to the flexible display device, the main region may be fixed in front of the first body and face forward, and the main region may form a front surface of the flexible display device.

When the second coupling structure is applied to the flexible display device, the main region may be fixed in front of the first body and face forward, and in the second state, the main region may be disposed between the first body and the second body.

A direction in front of the main region is a third direction as a direction perpendicular to the main region. The third direction is a direction perpendicular to the first direction and the second direction.

The edge region extends from the main region in a direction opposite to the first direction and forms an end of the flexible display. The edge region may have a convex curved surface to the outside, and a cross section thereof may be constantly formed along the second direction.

In some embodiments, a direction facing from the first position to the second position is the first direction.

When the first coupling structure is applied to the flexible display device, the second body may include a support.

The support is formed along a second direction perpendicular to the first direction.

The support may have a roller shape rotatable around a rotation axis in the second direction. That is, the support may be rotatably coupled to the second body.

When the second coupling structure is applied to the flexible display device, the flexible display device may include a hinge device that connects the first body and the second body to each other.

The hinge device is rotatably coupled to the first body, and is also rotatably coupled to the second body.

When the second coupling structure is applied to the flexible display device, the flexible display may be folded between the first body and the second body in the first position.

When the first coupling structure is applied to the flexible display device, a part of the second region is curved. A part of the second region is curved in a semicircular shape, and the position of the curved part of the second region is changed according to the movement of the second body.

When the first coupling structure is applied to the flexible display device, an area in which the second region forming the same plane as the first region is changed according to the movement of the second body.

When the first coupling structure is applied to the flexible display device and the second body moves in the first direction relative to the first body, an area of the second region forming the same plane as the first region increases. When the second body moves relative to the second body in a direction opposite to the first direction, an area of the second region forming the same plane as the first region is reduced.

When the first coupling structure is applied to the flexible display device, the second region may be curved around the support. In addition, the second region may form a curved surface by bending a part thereof around a curvature center line coinciding with a rotation axis of the support.

When the first coupling structure is applied to the flexible display device, the second region may include a first connection region and a second connection region.

The first connection region is a region extending from the first region.

The second connection region is a region extending from the first connection region.

In the first position, the first connection region may be curved by forming a curved surface around the support, and the second connection region may be parallel to the main region. In the first position, the first connection region may form a curved surface throughout the support. In the first position, the first connection region may form a semicircular curved surface with respect to the curvature center line.

In the second position, the first connection region may form the same plane as the main region, and a part of the second connection region may be curved while forming the curved surface around the support. In the second position, a part of the second connection region may form the curved surface throughout the support. A part of the second connection region in the second position may form a semicircular curved surface with respect to the curvature center line.

When the second coupling structure is applied to the flexible display device, the second region may include a third connection region and a fourth connection region.

The third connection region is a region extending from the main region.

The fourth connection region is a region extending from the third connection region.

When the second coupling structure is applied to the flexible display device, the flexible display may be folded in the first position and disposed between the first body and the second body. Furthermore, in the second position, the flexible display may be unfolded and formed in a flat shape on the whole.

In the first position, the third connection region is curved by forming a curved surface, and the fourth connection region be formed parallel to the first region. In the first position, the fourth connection region faces the main region.

In the second position, the third connection region may form the same plane as the main region, and the fourth connection region may also form the same plane as the main region.

According to one aspect of the subject described in the present invention, the flexible display device includes a speaker, and the first body includes a deco frame, a first sound radiation portion, and a second sound radiation portion.

The speaker is disposed inside the first body and is configured to output sound.

The deco frame is coupled along an edge of the first region.

The first sound radiation portion forms an outlet through which the sound (sound wave) of the speaker is radiated to the outside of the first body, and is formed on the opposite side of the first region based on the deco frame.

The second sound radiation portion forms an outlet through which the sound (sound wave) of the speaker is radiated to the outside of the first body, and is formed between the first region and the deco frame. In the second direction, the length of the second sound radiation portion may be ⅓ or more of the length of the first region.

The deco frame is disposed outside the edge region. The deco frame is disposed more outward than the edge region in the third direction.

In some embodiments, at least a part of the deco frame in the third direction overlaps with the edge region.

In some embodiments, the first body includes an inner channel and a filter.

The inner channel forms a passage through which the sound (sound wave) of the speaker moves in the third direction, as a space inside the first body, and communicates with the first sound radiation portion and the second sound radiation portion.

The filter is formed parallel to the second direction. The filter is disposed between the deco frame and the inner channel. In the filter, a plurality of sound radiation holes penetrated in the third direction are provided along the second direction.

The diameter of the sound radiation hole may be equal to or smaller than the width of the first sound radiation portion.

When viewed from the third direction, the first sound radiation portion and the sound radiation hole overlap with each other.

The first body includes an outer channel.

The outer channel is a space between the deco frame and the filter. The outer channel forms a passage through which the sound (sound wave) of the speaker moves and communicates with the first sound radiation portion and the second sound radiation portion.

The deco frame may be divided into a first deco frame, a second deco frame, and a third deco frame.

The first deco frame is formed parallel to the second direction.

The second deco frame and the third deco frame extend from opposite ends of the first deco frame, respectively, and are formed parallel to the first direction.

The first sound radiation portion and the second sound radiation portion are formed on opposite sides of the first deco frame, respectively.

An inner surface of the second deco frame and an inner surface of the third deco frame may be in close contact with the first region.

In some embodiments, the deco frame includes an intermediate channel.

The intermediate channel is a hole penetrating the deco frame inward and outward and may be inclined in the first direction toward the third direction. The intermediate channel may be formed along the second direction.

The deco frame may include a contact portion and a communication portion.

The contact portion protrudes inward from the inner surface of the deco frame. The contact portion may be configured to come into contact with the filter between the first sound radiation portion and the second sound radiation portion.

The communication part is a passage penetrating the contact portion in the first direction such that the first sound radiation portion and the second sound radiation portion communicate with each other.

The first body may include a speaker housing.

The speaker housing is fixed into the first body. The speaker is mounted inside the speaker housing so that a vibration plate of the speaker is perpendicular to the third direction.

The speaker housing is provided with a speaker duct opened in a direction opposite to the first direction so as to radiate the sound (sound wave) of the speaker.

In some embodiments, $A2$, which is the sum of the cross-sectional areas of an outer end of the speaker duct, is larger than $A1$, which is the sum of the cross-sectional areas of an inner end of the speaker duct.

When the first coupling structure is applied to the flexible display device, the flexible display device may include a support bar, a first movement guide groove, and a second movement guide groove.

A plurality of support bars are provided, are elongated in a direction parallel to the second direction, and are fixed to an inner surface of the second region.

The support bar may include a first support slider, a second support slider, and a connection arm.

The first support slider forms one end of the support bar.

The second support slider forms an end of the support bar on the opposite side of the first support slider.

The connection arm is configured to connect the first support slider and the second support slider and support the second region.

The first movement guide groove and the second movement guide groove are formed in the second body.

The first movement guide groove is formed in a U-shaped groove, and forms a passage through which the first support slider is inserted and moved.

The second movement guide groove is formed in a U-shaped groove, and forms a passage through which the second support slider is inserted and moved.

Effects

In one embodiment, a first sound radiation portion and a second sound radiation portion are formed on opposite sides of a deco frame, respectively. The second sound radiation portion is a space (gap) formed between an edge region of a first region and the deco frame. The deco frame is disposed outside the edge region, and at least a part of the deco frame overlaps with the edge region in the third direction. Therefore, the sound of the speaker formed inside the first body may be radiated to the outside through the first sound radiation portion and the second sound radiation portion to improve the sound quality of the speaker, and the second sound radiation portion can be prevented from being exposed from the outside or the exposure can be minimized.

In one embodiment, an inner channel and a filter are provided inside the first body. The inner channel is a space inside the first body and forms a passage through which the sound (sound wave) of the speaker moves in the third direction, and the filter is disposed between the deco frame and the inner channel. In the filter, a plurality of sound radiation holes penetrated in the third direction are provided along the second direction. The sound of the speaker is radiated through the first sound radiation portion and the second sound radiation portion through the inner channel and the sound radiation hole of the filter, and the filter may block movement of foreign substances that may be introduced through the first sound radiate unit and the second sound radiation portion.

In one embodiment, the deco frame includes a first deco frame parallel to the second direction, a second deco frame parallel to the first direction, and a third deco frame. An inner surface of the second deco frame and an inner surface of the third deco frame are in close contact with the first region. The deco frame includes a contact portion and a communication portion, and the contact portion and the communication portion may be formed in the first deco frame. The contact portion is in contact with the filter between the first sound radiation portion and the second sound radiation portion, and the communication portion is a passage penetrating the contact portion in the first direction such that the first sound radiation portion and the second sound radiation portion communicate with each other. Accordingly, the sound of the speaker may be radiated to the second sound radiation portion through the communication portion, and the deco frame and the filter may be firmly coupled to the first body.

DESCRIPTION OF DRAWINGS

FIG. 1 is a block diagram illustrating a flexible display device.

FIG. 2a is a perspective view illustrating a first state of the flexible display device, and FIG. 2b is a perspective view illustrating a second state in which the flexible display device illustrated in FIG. 2a is deformed.

FIG. 3a is a cross-sectional view taken along line A-A' of FIG. 2a. FIG. 3b is a cross-sectional view illustrating a state in which the flexible display device of FIG. 3a is deformed.

FIG. 4a is an exploded cross-sectional view of the flexible display of FIG. 3a, and FIG. 4b is an exploded cross-sectional view of the flexible display of FIG. 3b.

FIG. 5a is a cross-sectional view illustrating inner surfaces of a third side edge portion and a second edge portion, and FIG. 5b is a cross-sectional view illustrating inner surfaces of a fourth side edge portion and the second edge region.

FIG. 5c is a cross-sectional view schematically illustrating a state in which a support bar, an inner plate, and a flexible display are coupled.

FIG. 6a is a perspective view illustrating a first state of the flexible display device, FIG. 6B is a perspective view illustrating a second state in which the flexible display device illustrated in FIG. 6a is deformed, and FIG. 6c is a perspective view of the flexible display device of FIG. 6b when viewed from another direction.

FIG. 7a is a cross-sectional view taken along line B-B' of FIG. 6a. FIG. 7b is a cross-sectional view illustrating a state in which the flexible display device of FIG. 7a is deformed.

FIG. 8a is a perspective view illustrating a first body in a cross-sectional shape in the flexible display device according to one embodiment.

FIG. 8b is a diagram illustrating a deco frame in the flexible display device of FIG. 8a.

FIG. 9a is a perspective view illustrating the first body in a cross-sectional shape in the flexible display device according to one embodiment.

FIG. 9b is a view illustrating the deco frame in the flexible display device of FIG. 9a.

FIG. 10 is a perspective view illustrating a speaker module illustrated in FIGS. 8a and 9a, and FIG. 11 is a cross-sectional view of the speaker module of FIG. 10.

FIG. 12 is a cross-sectional view illustrating the first body in the flexible display device according to one embodiment, and FIG. 13 is a cross-sectional view illustrating a speaker module of FIG. 12.

FIGS. 14a and 14b are perspective views illustrating in a state in which the deco frame and the filter are separated according to one embodiment, respectively. Parts enlarged in FIGS. 14A and 14B are illustrated in a state in which the deco frame is coupled to the flexible display device.

FIGS. 15a and 15b are views illustrating results of measuring sound performance of the speaker module according to one embodiment of the present invention.

DETAILED DESCRIPTION

Hereinafter, exemplary embodiments disclosed herein will be described in detail with reference to the accompanying drawings, and like reference numerals designate like elements, and redundant description thereof will be omitted. Suffixes "module" and "unit or portion" for elements used in the following description are merely provided for facilitation of preparing this specification, and thus they are not granted a specific meaning or function. Wherever possible, the same reference numbers will be used throughout the drawings to refer to the same or like parts. In the following description, known functions or structures, which may confuse the substance of the present disclosure, are not explained. The accompanying drawings are used to help easily explain various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, and the like, may be used herein to describe various elements, these elements should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

The singular expressions include plural expressions unless the context clearly dictates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

A flexible display device (also referred to as a 'display device') described in the present specification may include a mobile terminal such as a portable phone, a smartphone, a laptop computer, a digital broadcast terminal, a personal digital assistant (PDA), a portable multimedia player (PMP), a navigation, a slate PC, a tablet PC, an ultra-book, a wearable device, a smart watch, a smart glass, a head mounted display (HMD), and the like.

It will be apparent to those skilled in the art that the configuration according to the embodiments disclosed in the present specification may be applied to fixed terminals such as a digital TV, a desktop computer, a digital signage, and the like, except for when the configuration is applied only to a mobile terminal. Hereinafter, in the present disclosure, for the convenience of description, the mobile terminal will be first described as an example of the flexible display device.

FIG. 1 is a block diagram for explaining a mobile terminal 100 related to the present disclosure.

The mobile terminal 100 may include a wireless transceiver 110, an input interface 120, a sensor 140, an output interface 150, an interface 160, a memory 170, a controller 180, and a power supply 190. The elements shown in FIG. 1 are not essential to implement the mobile terminal, and the mobile terminal described in this specification may include more or fewer elements than the above-enumerated elements.

More specifically, the wireless transceiver 110 may include one or more modules that enable wireless communications between the mobile terminal 100 and a wireless communication system, between the mobile terminal 100 and another mobile terminal 100, or between the mobile terminal 100 and an external server. Further, the wireless transceiver 110 may include one or more modules connecting the mobile terminal 100 to one or more networks.

The wireless transceiver 110 may include at least one of a broadcast receiving module 111, a mobile communication module 112, a wireless internet module 113, a near field communication module 114, or a position information module 115.

The input interface 120 may include a camera 121 or a video input interface, which are configured to receive input of a video signal, a microphone 122 or an audio input interface, which are configured to receive input of an audio signal, and a user input interface 123 (for example, a touch key or a mechanical key), which is configured to receive an input of information from a user. Voice data or image data collected by the input interface 120 may be analyzed and processed as a control command of the user.

The sensor 140 may include one or more sensors configured to sense at least one piece of information among information in the mobile terminal, surrounding environment information of the mobile terminal, or user information. For example, the sensor 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, a gas sensor, etc.), and a chemical sensor (for example, an electronic nose, a healthcare sensor, or a biometric sensor). Further, the mobile terminal disclosed in the present specification may combine information sensed by at least two sensors from the above-mentioned sensors and may use the combined information.

The output interface 150 may be for generating outputs related to visual, auditory, or tactile senses, and may include at least one of a display 151, a sound output interface 152, a haptic module 153, or an optical output interface 154. The display 151 may form a mutual layer structure with a touch sensor or may be formed integrally with a touch sensor, to be implemented as a touch screen. The touch screen may serve as a user input interface 123 configured to provide an input interface between the mobile terminal 100 and the user, and at the same time, may provide an output interface between the mobile terminal 100 and the user.

The interface 160 may serve as a passage between the mobile terminal 100 and various types of external devices connected to the mobile terminal 100. The interface 160 may include at least one of a wired/wireless headset port, an external charger port, a wired/wireless data port, a memory card port, a port for connecting a device equipped with an identification module, an audio input/output (I/O) port, a video input/output (I/O) port, or an earphone port. In response to a connection between an external device and the interface 160, the mobile terminal 100 may perform an appropriate control regarding the connected external device.

Further, the memory 170 may store therein data supporting various functions of the mobile terminal 100. The memory 170 may store therein a plurality of application programs (or applications) driven in the mobile terminal 100, data for operations of the mobile terminal 100, and commands. At least some of the application programs may be downloaded from an external server through wireless communication. Further, for the basic functions of the mobile terminal 100 (for example, functions for receiving and making calls and receiving and sending messages), at least some of the application programs may be provided in the mobile terminal 100 from the time of manufacture. The application programs may be stored in the memory 170 and installed on the mobile terminal 100 so as to be driven by the controller 180 to perform operations (or functions) of the mobile terminal 100.

In addition to the operations related to the application programs, the controller 180 may generally control overall operation of the mobile terminal 100. The controller 180 may process a signal, data, or information that is inputted or outputted through the above-described elements or drive the application programs stored in the memory 170 to thereby provide appropriate information or functions to the user or process them.

Further, in order to drive the application programs stored in the memory 170, the controller 180 may control at least one of the elements described with reference to FIG. 1. Moreover, the controller 180 may combine and operate at least two of the elements included in the mobile terminal 100 to drive the application programs.

Under the control of the controller 180, the power supply 190 may be supplied with external power or internal power, and supply power to each element included in the mobile terminal 100. The power supply 190 may include a battery, and the battery may be an internal battery or a replaceable battery.

At least some of the above-described elements may operate in cooperation with each other to implement the operation or control of the mobile terminal or the control method of the mobile terminal according to various embodiments which will be described below. Further, the operation or control of the mobile terminal or the control method of the mobile terminal may be implemented on the mobile terminal by driving at least one application program stored in the memory 170.

Hereinafter, prior to describing various embodiments implemented by the mobile terminal 100 described above, the above-mentioned elements will be described in more detail with reference to FIG. 1.

The broadcast receiving module 111 of the wireless transceiver 110 may receive a broadcast signal and/or broadcast-related information from an external broadcast management server through a broadcast channel. The broadcast channel may include a satellite channel and a ground wave channel. The mobile terminal 100 may be provided with two or more broadcast receiving modules for simultaneous reception of at least two broadcast channels or for broadcast channel switching.

The broadcast management server may refer to a server that generates and transmits a broadcast signal and/or broadcast-related information, or a server that is supplied with a previously generated broadcast signal and/or broadcast-related information and transmits the supplied broadcast signal and/or broadcast-related information to the mobile terminal 100. The broadcast signal may include not only a TV broadcast signal, a radio broadcast signal, and a data broadcast signal, but also a broadcast signal obtained by combining a TV broadcast signal or a radio broadcast signal with a data broadcast signal.

The broadcast signal may be encoded according to at least one of technical standards for transmission and reception of a digital broadcast signal (or broadcast schemes, such as ISO, IEC, DVB, or ATSC), and the broadcast receiving module 111 may receive the digital broadcast signal by using an appropriate method meeting the technical specification determined by the technical standards.

The broadcast-related information may refer to information related to a broadcast channel, a broadcast program, or a broadcast service provider. The broadcast-related information may also be provided through the mobile communication network. Here, the broadcasting-related information may be received by the mobile communication module 112.

The broadcast-related information may exist in various forms, such as an electronic program guide of digital multimedia broadcasting (DMB) or an electronic service guide of a digital video broadcast-handheld (DVB-H). The broadcast signal and/or the broadcast-related information received through the broadcast receiving module 111 may be stored in the memory 170.

The mobile communication module 112 may transmit/receive a wireless signal to/from at least one of a base station, an external terminal, or a server on a mobile communication network established according to the technical standards for mobile communications or communication methods (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include a voice call signal, a video call signal, or various forms of data for transmission or reception of a text/multimedia message.

The wireless internet module 113 may refer to a module for wireless Internet connection, and may be installed in the mobile terminal 100 or installed outside the mobile terminal 100. The wireless internet module 113 may be configured to transmit and receive a wireless signal over a communication network according to wireless Internet technologies.

Wireless Internet technologies may include, for example, wireless LAN (WLAN), wireless fidelity (Wi-Fi), Wi-Fi direct, Digital Living Network Alliance (DLNA), wireless broadband (WiBro), Worldwide Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless internet module 113 may transmit and receive data in accordance with at least one wireless Internet technology from among the above-mentioned wireless Internet technologies and wireless Internet technologies that were not described above.

From the viewpoint that the wireless internet connection through, for example, WiBro, HSDPA, HSUPA, GSM, CDMA, WCDMA, LTE, and LTE-A is made through the mobile communication network, the wireless internet module 113, which performs the wireless Internet connection through the mobile communication network, may be understood as one type of the mobile communication module 112.

The near field communication module 114 may be for short-range communications, and may support short-range communications by using at least one of Bluetooth™, radio frequency identification (RFID), infrared data association (IrDA), ultra wideband (UWB), ZigBee, Short-range Communication (NFC), wireless fidelity (Wi-Fi), Wi-Fi Direct, or Wireless Universal Serial Bus (Wireless USB). The near field communication module 114 may support wireless communications, over a near-field wireless communication network, between the mobile terminal 100 and the wireless communication system, between the mobile terminal 100 and another mobile terminal 100, or between the mobile terminal 100 and a network in which another mobile terminal 100 (or external server) is located. The near-field wireless communication network may be a wireless personal area network.

Here, the another mobile terminal 100 may be a wearable device (for example, a smart watch, a smart glass, or a head mounted display (HMD)) capable of exchanging data (or interworking) with the mobile terminal 100 according to the present disclosure. The near field communication module 114 may sense (or recognize) the presence of a wearable device that is capable of communicating with the mobile terminal 100, in the vicinity of the mobile terminal 100. Moreover, when the detected wearable device is a device that has been authenticated to communicate with the mobile terminal 100 according to the present disclosure, the controller 180 may transmit at least a portion of data processed in the mobile terminal 100 to the wearable device through the near field communication module 114. Therefore, the user of the wearable device may use, through the wearable device, the data that have been processed in the mobile terminal 100. For example, according to this, when a phone call is received by the mobile terminal 100, the user may receive the phone call through the wearable device, or when a message is received by the mobile terminal 100, the user may check the received message through the wearable device.

The position information module 115 may be a module for obtaining a position (or a current position) of a mobile terminal, and its representative examples may include a global positioning system (GPS) module or a wireless fidelity (Wi-Fi) module. For example, when a GPS module is utilized, the mobile terminal may obtain the position of the mobile terminal by using a signal transmitted from a GPS satellite. As another example, when a Wi-Fi module is utilized, the mobile terminal may obtain the position of the mobile terminal on the basis of information on a wireless access point (AP) which transmits and receives wireless signals to and from the Wi-Fi module. If necessary, the position information module 115 may alternatively or additionally perform a function of another module of the wireless transceiver 110 to obtain data on the position of the mobile terminal. The position information module 115 may be a module used to obtain the position (or the current position) of the mobile terminal, and is not limited to a module that directly calculates or obtains the position of the mobile terminal.

Next, the input interface 120 may be for receiving input of video information (or signal), audio information (or signal), data, or information inputted by the user. For receiving input of the video information, the mobile terminal 100 may include a camera 121 or a plurality of cameras 121. The camera 121 may process an image frame such as a still image or a moving image obtained by an image sensor in a video call mode or a photographing mode. The processed image frame may be displayed on the display 151 or stored in the memory 170. Further, the plurality of cameras 121 provided in the mobile terminal 100 may be arranged to form a matrix structure, and a plurality of pieces of image information having various angles or focal points may be inputted to the mobile terminal 100 through the plurality of cameras 121 forming the matrix structure. In addition, the plurality of cameras 121 may be arranged to form a stereo structure to obtain left and right images used to implement a stereoscopic image.

The microphone 122 may process an external sound signal into electric voice data. The processed voice data may be utilized in various manners in accordance with the function that is being performed in the mobile terminal 100 (or in accordance with an application program that is being executed). Various noise removal algorithms for removing noise generated during the process of receiving the external sound signal may be implemented in the microphone 122.

The user input interface 123 may be for receiving information from the user, and when information is inputted through the user input interface 123, the controller 180 may control operation of the mobile terminal 100 so as to correspond to the inputted information. The user input interface 123 may include a mechanical input interface (or a mechanical key, such as a button located on a front, rear, or side surface of the mobile terminal 100, a dome switch, a jog wheel, a jog switch, etc.) and a touch type input interface. For example, the touch type input interface may be formed as a virtual key, a soft key, or a visual key displayed on a touch screen through a software process, or as a touch key disposed in a part other than the touch screen. The virtual key or the visual key may be displayed on the touch screen in various shapes, and may include, for example, graphics, text, icons, video, or a combination thereof.

The sensor 140 may sense at least one of information in the mobile terminal, information of the surrounding environment of the mobile terminal, or user information, and generate a sensing signal corresponding to sensed information. On the basis of the sensing signal, the controller 180 may control the driving or operation of the mobile terminal 100 or perform data processing, functions, or operations related to an application program installed in the mobile terminal 100. Representative sensors among various sensors that can be included in the sensor 140 will now be described in more detail.

First, the proximity sensor 141 may be a sensor that senses the presence of an object that is approaching a predetermined sensing surface or the presence of nearby objects, by using the force of an electromagnetic field or infrared ray without any mechanical contact. The proximity sensor 141 may be disposed in an internal area of the mobile terminal 100, which is enclosed by the above-described touch screen, or may be disposed in the vicinity of the touch screen.

Examples of the proximity sensor 141 may include a transmission type photoelectric sensor, a direct reflection type photoelectric sensor, a mirror reflection type photoelectric sensor, a high frequency oscillation type proximity sensor, a capacitive proximity sensor, a magnetic proximity sensor, and an infrared proximity sensor. When the touch screen is a capacitive type, the proximity sensor 141 may be configured to detect proximity of an object by sensing a change in the electric field caused by an approaching object having conductivity. Here, the touch screen (or the touch sensor) itself may be classified as a proximity sensor.

For convenience of description, when an object approaches the touch screen without contacting the touch screen, and it is recognized that the object is located above the touch screen, it is referred to as a "proximity touch." When the object actually touches the touch screen, it is referred to as a "contact touch." A position at which the object proximately touches the touch screen may be a position at which the object vertically corresponds to the touch screen when the object proximately touches the touch screen. The proximity sensor 141 may sense a proximity touch and a proximity touch pattern (for example, a proximity touch distance, a proximity touch direction, a proximity touch speed, a proximity touch time, a proximity touch position, a proximity touch movement state, etc.). As described above, the controller 180 may process data (or information) corresponding to a proximate touch operation and a proximate touch pattern sensed by the proximity sensor 141, and may output visual information corresponding to the processed data on the touch screen. Furthermore, the controller 180 may control the mobile terminal 100 to process different operations or data (or information) depending on whether the touch on the same point on the touch screen is the proximity touch or the contact touch.

The touch sensor may sense a touch (or a touch input) applied to the touch screen (or the display 151) by using at least one of various touch types, such as a resistive film type, a capacitive type, an infrared type, an ultrasonic type, and a magnetic field type.

For example, the touch sensor may be configured to convert a change in pressure that is applied to a specific portion of the touch screen, or a change in capacitance that is generated in a specific portion of the touch screen, into an electrical input signal. The touch sensor may be configured to detect a position where a touch subject which applies a touch onto the touch screen is touched on the touch sensor, the surface area of the touch, the pressure of the touch, and the capacitance at the time of the touch. Here, the touch subject may be an object that applies a touch to the touch sensor, and may include, for example, a finger, a touch pen, a stylus pen, and a pointer.

As described above, when there is a touch input to the touch sensor, a signal or signals corresponding to the touch input may be transmitted to a touch controller. The touch controller may process the signal(s) and then transmit corresponding data to the controller 180. Then, the controller 180 may confirm which area of the display 151 was touched. Here, the touch controller may be a separate element from the controller 180, or may be the controller 180 itself.

The controller 180 may perform a different control or the same control depending on a type of a touch subject touching the touch screen (or a touch key provided other than the touch screen). Whether to perform a different control or the same control depending on the type of touch subject may be determined in accordance with a current operating state of the mobile terminal 100 or an application program that is being executed.

The touch sensor and the proximity sensor described above may, independently or in combination, sense various types of touches on the touch screen, such as a short (or tap) touch, a long touch, a multi touch, a drag touch, a flick touch, a pinch-in touch, a pinch-out touch, a swipe touch, or a hovering touch.

The ultrasonic sensor may recognize position information of a sensing object by using an ultrasonic wave. The controller 180 may be able to calculate a position of a wave generating source from information sensed by an optical sensor and a plurality of ultrasonic sensors. The position of the wave generating source may be calculated by using the property of light that light is much faster than an ultrasonic wave, that is, the time in which light reaches the optical sensor is much shorter than the time in which the ultrasonic wave reaches the ultrasonic sensor. More specifically, the position of the wave generating source may be calculated by using the difference between the arrival time of the ultrasonic wave and the arrival time of the light, with the light as a reference signal.

As an element of the input interface 120, the camera 121 may include at least one of a camera sensor (for example, a CCD or a CMOS), a photo sensor (or an image sensor), or a laser sensor.

The camera 121 and the laser sensor may be combined to sense a touch of a sensing object for a three-dimensional stereoscopic image. The photo sensor may be stacked on a display element and may be configured to scan a motion of the sensing object proximate to the touch screen. More specifically, the photo sensor may be formed by mounting a photo diode and a transistor (TR) in rows/columns to scan an object on the photo sensor by using an electrical signal which changes in accordance with the amount of light applied to the photo diode. That is, the photo sensor may calculate coordinates of a sensing object in accordance with a change in the amount of light, to thereby obtain position information of the sensing object.

The display 151 may display (output) information processed in the mobile terminal 100. For example, the display 151 may display execution screen information of an application program driven in the mobile terminal 100, or user interface (UI) and graphic user interface (GUI) information in accordance with the execution screen information.

Further, the display 151 may be configured as a stereoscopic display which displays a stereoscopic video.

A three-dimensional display type, such as a stereoscopic type (a glasses type), an autostereoscopic type (a glasses-free type), and a projection type (a holographic type), may be applied to the stereoscopic display.

The sound output interface 152 may output audio data received from the wireless transceiver 110 in, for example, a call signal reception mode, a phone-call mode, a recording mode, a voice recognition mode, and a broadcast reception mode, or audio data stored in the memory 170. The sound output interface 152 may also output a sound signal (for example, a call signal reception sound and a message reception sound) related to a function performed in the mobile terminal 100. The sound output interface 152 may include, for example, a receiver, a speaker, and a buzzer.

The haptic module 153 may generate various tactile effects the user can feel. A representative example of the tactile effect generated by the haptic module 153 may be vibration. An intensity and a pattern of the vibration generated in the haptic module 153 may be controlled by the user or a setting of the controller 180. For example, the haptic module 153 may synthesize vibrations different from one another to output the synthesized vibrations, or sequentially output the different vibrations.

In addition to vibration, the haptic module 153 may generate various tactile effects, such as effects by a pin arrangement which vertically moves to a contact skin surface, an injection force or a suction force of air through an injection port or a suction port, grazing on a skin surface, electrode contact, or stimulation of an electrostatic force or effects of reproducing a cold or hot sensation using a heat absorbing or heat emitting element.

The haptic module 153 may not only transmit a tactile effect through direct contact, but may also be implemented to allow the user to feel a tactile effect through muscular sensation of a finger or an arm. Two or more haptic modules 153 may be provided depending on the configuration of the mobile terminal 100.

The optical output interface 154 may output a signal for providing notification of occurrence of an event by using light of a light source of the mobile terminal 100. Examples of the events generated in the mobile terminal 100 may include, for example, message reception, call signal reception, missed call, alarm, schedule notification, email reception, and information reception through an application.

The signal outputted from the optical output interface 154 may be implemented as the mobile terminal 100 emits light of a single color or a plurality of colors to a front surface or a rear surface thereof. The output of the signal may end as the mobile terminal 100 senses confirmation of the event by the user.

The interface 160 may serve as a passage to all external devices that are connected to the mobile terminal 100. The interface 160 may receive data from an external device or may be supplied with the power source and transmit the supplied power source to each element in the mobile terminal 100, or may transmit data in the mobile terminal 100 to an external device. The interface 160 may include, for example, a wired/wireless headset port, an external charger port, a wired/wireless data port, a memory card port, a port for connecting a device equipped with an identification module, an audio input/output (I/O) port, a video input/output (I/O) port, and an earphone port.

The identification module may be a chip in which various information for authenticating a user right of the mobile terminal 100 is stored, and may include a user identification module (UIM), a subscriber identification module (SIM), and a universal subscriber identity module (USIM). A device provided with an identification module (hereinafter, "identification device") may be manufactured in the form of a smart card. Therefore, the identification device may be connected to the mobile terminal 100 through the interface 160.

When the mobile terminal 100 is connected to an external cradle, the interface 160 may serve as a passage through which power is supplied from the cradle to the mobile terminal 100 or a passage through which various command signals inputted to the cradle by a user are transmitted to the mobile terminal 100. Various command signals inputted from the cradle or the power source may serve as a signal for recognizing that the mobile terminal 100 has been precisely mounted in the cradle.

The memory 170 may store a program for operation of the controller 180, or temporarily store inputted/outputted data (for example, a phone book, a message, a still image, and a moving image). The memory 170 may store data on various patterns of vibration or sound outputted when a touch is inputted onto the touch screen.

The memory 170 may include at least one type of storage medium from among a flash memory type, a hard disk type, a solid state disk (SSD) type, a silicon disk drive (SDD) type, a multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. The mobile terminal 100 may operate in association with a web storage which performs a storage function of the memory 170 on the Internet.

As described above, the controller 180 may control an operation related to application programs and overall operation of the mobile terminal 100. For example, when the state of the mobile terminal 100 satisfies a predetermined condition, the controller 180 may perform a locking function which limits input of a control command of a user for applications or may release the locking function.

Further, the controller 180 may perform control and processing related to voice call, data communication, and video call, or perform a pattern recognition process by which a handwriting input or a picture drawing input performed on the touch screen may be recognized as a text or an image, respectively. Moreover, the controller 180 may control any one element or a combination of a plurality of the elements described above, to implement various embodiments of the mobile terminal 100 according to the present disclosure which will now be described below.

Under the control of the controller 180, the power supply 190 may be supplied with an external power or an internal power and may supply power required for operating each element. The power supply 190 may include a battery, wherein the battery may be an embedded rechargeable battery or may be detachably coupled to a body of the mobile terminal 100 to be charged.

Further, the power supply 190 may be provided with a connection port, and the connection port may be configured as one example of the interface 160 to which an external charger that supplies power for charging the battery is electrically connected.

As another example, the power supply 190 may be configured to wirelessly charge the battery without using the connection port. Here, the power supply 190 may receive power from an external wireless power transmission device by using one or more of an inductive coupling scheme based on a magnetic induction phenomenon or a magnetic resonance coupling scheme based on an electromagnetic resonance phenomenon.

Various embodiments that will now be described below may be implemented in a recording medium which can be read by a computer or a device similar thereto by using software, hardware, or a combination thereof, for example.

The display 151 may display (output) information processed in the mobile terminal 100. For example, the display 151 may display execution screen information of an application program driven in the mobile terminal 100, or user interface (UI) and graphic user interface (GUI) information in accordance with the execution screen information.

The display 151 may include at least one of a liquid crystal display (LCD), a thin film transistor liquid crystal display (TFT LCD), an organic light emitting diode (OLED), a flexible display, a three-dimensional display (3D display), or an electronic ink display (e-ink display).

Further, the display 151 may be two or more displays 151 depending on the implementation of the mobile terminal 100. Here, a plurality of displays 151 may be disposed to be spaced apart from each other or disposed integrally on one surface of the mobile terminal 100, or each of the plurality of displays 151 may be disposed on different surfaces of the mobile terminal 100.

The display 151 may include a touch sensor which senses a touch on the display 151 so as to receive input of a control command in the touch method. When a touch is made on the display 151, the touch sensor may sense the touch, and on the basis of the sensed touch, the controller 180 may generate a control command corresponding to the sensed touch. Contents inputted through the touch method may include letters, numbers, instructions in various modes, and menu items.

The microphone 122 may be configured to receive voice of the user and other sounds. The microphone 122 may be provided in a plurality of positions so as to receive stereo sounds.

The interface 160 may serve as a passage connecting the mobile terminal 100 to external devices. For example, the interface 160 may be at least one of a connection terminal for connection with other devices (for example, an earphone or an external speaker), a port for short-range communications (for example, an infrared port (IrDA port), a Bluetooth port, a wireless LAN port, etc.), or a power supply terminal for supplying power to the mobile terminal 100. The interface 160 may be implemented in the form of a socket accommodating an external card, such as a subscriber identification module (SIM), a user identity module (UIM), and a memory card for storing information.

At least one antenna for wireless communications may be provided in the body of the mobile terminal 100. The antenna may be embedded in the body of the mobile terminal 100 or may be formed in a case. For example, an antenna that forms a part of the broadcast receiving module 111 (see FIG. 1) may be implemented so as to be drawable from the body of the mobile terminal 100. Alternatively, the antenna may be formed as a film type to be attached to an inner surface of a housing, or a case including a conductive material may serve as an antenna.

The power supply 190 (see FIG. 1) for supplying power to the mobile terminal 100 may be provided in the body of the mobile terminal 100. The power supply 190 may be embedded in the body of the mobile terminal 100, or may include a battery 191 outside the body of the mobile terminal 100, the battery 191 being detachable.

The battery 191 may be configured to be supplied with power through a power cable connected to the interface 160. Further, the battery 191 may be configured to be wirelessly charged by a wireless charging device. The wireless charging may be implemented by a magnetic induction scheme or a resonance scheme (magnetic resonance scheme).

An accessory that protects an exterior of the mobile terminal 100 or supports or extends a function thereof may be added to the mobile terminal 100. An example of the accessory may be a cover that covers at least one surface of the mobile terminal 100 or a pouch accommodating the mobile terminal 100. The cover or the pouch, in conjunction with the display 151, may extend the function of the mobile terminal 100. Another example of the accessory may be a touch pen which supports or extends a touch input on the touch screen.

The flexible display device 1 according to the embodiment of the present disclosure may include a flexible display 300 which is configured to be deformed by an external force.

The deformation may be at least one of warping, bending, folding, twisting, rolling, or spreading of a display module. Such a deformable display module may be referred to as a "flexible display." Here, the flexible display 300 may include a general flexible display, an electronic paper (e-paper), and a combination thereof.

A general flexible display refers to a durable display which, while still having characteristics of existing flat panel displays, is produced on a thin and flexible substrate which can be warped, bent, folded, twisted, rolled, and spread like paper, so as to be light in weight and not to be easily broken.

Further, electronic paper is a display technique to which characteristics of general ink are applied. Electronic paper may be different from existing flat panel displays in that electronic paper uses reflection light. Electronic paper may change information thereon by using a twist ball or electrophoresis using a capsule.

Information displayed on the flexible display 300 may include visual information outputted on a curved surface. The visual information may be implemented as the light emission of unit pixels (sub pixels) that are arranged in a matrix form is independently controlled. The unit pixel refers to a minimum unit for implementing one color.

A portion of the flexible display 300 may be in a bent state, not in a flat state. Here, when an external force is applied to the flexible display 300, a portion of the flexible display 300 may be deformed into a flat state, a less bent state, or a more bent state.

Meanwhile, the flexible display 300 may be combined with a touch sensor to implement a flexible touch screen. When a touch input is made on the flexible touch screen, the controller 180 (see FIG. 1) may perform control corresponding to the touch input. The flexible touch screen may be configured to sense a touch input while a portion of the flexible display 300 is in the flat state or in the bent state.

A flexible display device 1 according to the example in which the flexible display 300 is deformable may include a deformation sensor capable of sensing deformation in the flexible display 300. The deformation sensor may be included in the sensor 140 (see FIG. 1).

The deformation sensor may be provided in the flexible display 300 or in a body 200, and may sense information related to deformation of the flexible display 300. Here, the information related to the deformation may include information on a direction in which the flexible display 300 is deformed, information on a degree of the deformation of the flexible display 300, information on a position of the deformation in the flexible display 300, information on a time of the deformation, and information on an acceleration at which the deformed flexible display 300 is recovered. In addition to the above information, various other types of information that can be sensed as the flexible display 300 is bent may also be included.

Further, the controller 180 (see FIG. 1) may change information displayed on the flexible display 300 or generate a control signal for controlling a function of the flexible display device 1, on the basis of the information related to the deformation of the flexible display 300 sensed by the deformation sensor.

The deformation of the flexible display 300 may not be limited to the deformation caused by an external force. For example, when the flexible display 300 is in a state in which a portion thereof is spread, the portion may be deformed to be bent by a command of the user or an application.

In describing embodiments of the present disclosure, a first direction (X direction), a second direction (Y direction), and a third direction (Z direction) shown in the drawings are directions perpendicular to one another.

The flexible display device 1 may include a body 200.

The body 200 may be divided into two or more parts. The body 200 may include the first body 200*a* and the second body 200*b*.

The first body 200*a* and the second body 200*b* may be coupled to each other so as to be relatively movable.

The second body 200*b* may reciprocate relative to the first body 200*a* between a first position and a second position.

When the second body 200*b* is in the first position relative to the first body 200*a*, it can be said that the flexible display device is in a first state (see FIGS. 2*a* and 6*a*), and when the second body 200*b* is in the second position relative to the first body 200*a*, it can be said that the flexible display device is in a second state (see FIGS. 2*b* and 6*b*).

When the flexible display device 1 is deformed between the first state and the second state, the shape of the flexible display 300 is deformed, and the size of the area of the same plane in the flexible display 300 is deformed.

The area of the flexible display 300 that forms the same plane in the first state may be relatively small, and the area of the flexible display 300 that forms the same plane in the second state may be relatively large.

The area of the flexible display 300 that forms the same plane in the first state may be the smallest, and the area of the flexible display 300 that forms the same plane in the second state may be the largest.

The body 200 may form an overall shape of the display device 1. The body 200 may form a frame of the flexible display device 1. The body 200 may be made of a relatively hard material, and may include, for example, plastic, carbon, metal, or them. Other components constituting the display device 1 may be coupled to the body 200.

The body 200 may have various shapes which may support other components coupled thereto.

The body 200 may be formed in a flat shape on the whole, or may be formed in a bent shape such as the curved surface. The body 200 may have a form in which an interior is filled on the whole, and may have a form in which a part is not filled.

For example, when viewed from the front (front in the third direction), the body 200 may be formed in a rectangular form on the whole, and formed in a flat form on the whole.

When viewed from the front or back, the total area (the area of the body 200 projected in the Z direction) occupied by the body 200 in the first position may be made the smallest (see FIGS. 2*a* and 6*a*), and the total area (the area of the body 200 projected in the Z direction) occupied by the body 200 in the second position (second state) may be made the largest (see FIGS. 2*b* and 6*b*).

When viewed from the front or back, the area where the first body 200*a* and the second body 200*b* overlap with each other in the first position may be made the largest (see FIGS. 2*a* and 6*a*), and the area where the first body 200*a* and the second body 200*b* overlap with each other in the second position is the smallest (see FIGS. 2*b* and 6*b*).

The first body 200*a* may have a predetermined length in a first direction (X direction), and may have a predetermined length in a second direction (Y direction) perpendicular to the first direction. The first body 200*a* may have a predetermined length in a third direction (Z direction) perpendicular to the first direction and the second direction, but the length in the third direction is sufficiently shorter than the length in the first direction and the second direction. Accordingly, the first body 200a may be formed in a substantially flat form along the first and second directions, or may be formed in a flat form along the first and second directions.

The first body 200a may have a plate shape.

The second body 200b will be described based on the first position (first state) or the second position (second state).

The second body 200b is formed to have a predetermined length along the first direction and the second direction. The second body 200b may have a predetermined length in the third direction, but the length in the third direction is sufficiently shorter than the length in the first direction and the second direction. Accordingly, the second body 200b may be in a substantially flat form along the first direction and the second direction, or may be formed in a flat form along the first and second directions.

The second body 200b may be formed in a plate form.

In the first position (first state) or the second position (second state), the first body 200a and the second body 200b may be formed in a plate form parallel to each other.

In one embodiment, the first body and the second body may be coupled (a first coupling structure) to slide (M1) with each other (see FIGS. 2a and 2b), and in another embodiment, the first body and the second body may be coupled (a second coupling structure) to be rotatable (M2) (see FIGS. 6a and 6b).

Hereinafter, the flexible display device 1 with the first coupling structure will be described first, and the flexible display device 1 with the second coupling structure will be then described.

Flexible Display Device with the First Coupling Structure

FIG. 2a is a perspective view illustrating the first state of the flexible display device 1, and FIG. 2b is a perspective view illustrating the second state in which the flexible display device 1 illustrated in FIG. 2a is deformed.

FIG. 3a is a cross-sectional view taken along line A-A' of FIG. 2a. FIG. 3b is a cross-sectional view illustrating a state in which the flexible display device 1 of FIG. 3a is deformed.

FIG. 4a is an exploded cross-sectional view of the flexible display 300 of FIG. 3a, and FIG. 4b is an exploded cross-sectional view of the flexible display 300 of FIG. 3b.

FIG. 5a is a cross-sectional view illustrating the inner surfaces of a third side edge portion 250 and a second edge portion 206, and FIG. 5b is a cross-sectional view illustrating the inner surfaces of a fourth side edge portion 260 and the second edge portion 206.

FIG. 5c is a cross-sectional view schematically illustrating a state in which a support bar 370, an inner plate 350, and the flexible displays 300 and 320 are coupled.

The flexible display device 1 may include a support bar 370 and a support 400.

The flexible display device 1 may include two surfaces 1a and 1b facing each other. The flexible display device 1 may include a first surface 1a and a second surface 1b, and a direction in which the first surface 1a faces (a direction perpendicular to or substantially perpendicular to the first surface 1a) is opposite to a direction in which the second surface 1b faces (a direction perpendicular to or substantially perpendicular to the second surface 1b). The flexible display device 1 may be disposed such that the first surface 1a faces the third direction (Z direction), and the second surface 1b faces the opposite direction of the third direction (Z direction). If the first surface 1a is the front surface of the flexible display device 1, the second surface 1b becomes the rear surface of the flexible display device 1.

In the description of the embodiment of the present invention, except for a particularly limited case, a front direction of the flexible display device 1 is described as the third direction (Z direction), and the rear direction of the flexible display device 1 is described as an opposite direction of the third direction (Z direction).

The second body 200b may be configured to slide and reciprocate (M1) relative to the first body 200a, and accordingly, the total area occupied by the body 200 may be changed when viewed from the front (Z.)

The movement direction of the second body 200b relative to the first body 200a may be parallel to the first direction (X direction).

The support 400 may be coupled to the second body 200b. The support 400 may be fixed to the second body 200b.

The support 400 may be formed along the second direction (Y). The support 400 may be formed to extend in the second direction (Y direction), and may have a constant cross section along the second direction.

In the flexible display device 1, the support 400 may be formed to support a portion of an inner surface of the flexible display 300. That is, a portion of the flexible display 300 may be curved around the support 400, and a direction of formation of the flexible display 300 may be changed along the circumferential direction of the support 400.

The support 400 may be formed to rotate in both directions about a central axis 401 which is parallel to the second direction. That is, the support 400 may be coupled to the second body 200b so as to rotate about the central axis 401. (The position of the central axis 401 of the support 400 may be fixed to the second body 200b.)

The support 400 may be formed in the shape of a roller.

The flexible display 300 may be formed in the form of a thin film, and may have an outer surface and an inner surface. The outer surface of the flexible display 300 may be a surface facing an outside of the flexible display device 1, and the inner surface of the flexible display 300 may be a surface facing an inside of the flexible display device 1. An image may be displayed on at least a portion of the outer surface of the flexible display 300.

When the second body 200b moves relative to the first body 200a, the flexible display 300, which is formed such that at least a portion thereof is curved, may change in shape.

The flexible display 300 may include a first region 310 and a second region 320 which are connected to each other.

The flexible display 300 may include a first region 310, a second region 320, and a third region 330, which are sequentially connected.

The first region 310 may include a main region 311 and an edge region 312.

If the flexible display 300 is not coupled to the body 200 and is spread flat, the edge region 312, the main region 311, the second region 320, and the third region 330 may form a single plane.

Broken lines shown in FIG. 2b are imaginary lines respectively representing a boundary between the main region 311 and (a first connected region 321 of) the second region 320, and a boundary between the first connected region 321 and a second connected region 322.

The first region 310 may have a predetermined area and may be coupled to the body 200 from any one side of the body 200. The first region 310 may be coupled to the first body 200a, and may be fixed to the first body 200a. That is, the first region 310 may be formed so as not to move relative to the first body 200a.

The main region 311 may be parallel to the first and second directions. The main region 311 may be fixed in front of the first body 200*a*. The main region 311 may be fixed in front of the first body 200*a* based on the third direction. The main region 311 and the first body 200*a* may be coupled to each other so as to be parallel to each other.

In one embodiment of the present disclosure, the main region 311 may form a curved surface as a whole. Here, when the second body 200*b* is in the first position, a curvature of the main region 311 may be smaller than a curvature of the first connected region 321, and a radius of curvature of the main region 311 may be greater than a radius of curvature of the first connected region 321. When the second body 200*b* is in the first position, the radius of curvature of the main region 311 may be sufficiently greater than the radius of curvature of the first connected region 321. For example, when the radius of curvature of the first connected region 321 is "a," the radius of curvature of the main region 311 may be "10*a" or greater.

In another embodiment of the present disclosure, the main region 311 may form a plane surface as a whole. The main region 311 may form a planar outer surface of the flexible display 300 and may be disposed on a front surface of the body 200. The main region 311 may have a constant cross section in the first and second directions.

Hereinafter, description will be made on the assumption that the main region 311 of the flexible display device 1 is a plane surface.

A direction the main region 311 faces (i.e. a direction an outer surface of the main region 311 faces) may be the third direction. The main region 311 may form a part or the entirety of the first surface 1*a* of the flexible display device 1.

The edge region 312 may extend from the main region 311 and form an end portion of the flexible display 300. The edge region 312 may have a constant cross section along the second direction, and may form an outwardly convex curved surface. In one embodiment, the edge region 312 may form a dummy portion on which an image is not displayed, or in another embodiment, an image may be displayed on the edge region 312.

The second region 320 may extend from the main region 311, and a portion of the second region 320 may be curved around support 400. That is, a direction of formation of the second region 320 may be changed as the second region 320 passes around the support 400.

The second region 320 may have a constant cross section along the second direction.

A portion of the second region 320 may be curved into a semicircular shape, and a curved position of the second region 320 may change according to movement of the second body 200*b*.

The second region 320 may include the first connected region 321 and the second connected region 322.

When the second body 200*b* is in the first position, the first connected region 321 may be curved into a semicircular shape, and when the second body 200*b* is in the second position, a portion of the second connected region 322 may be curved into a semicircular shape.

The first connected region 321 may be directly connected to the main region 311, and the second connected region 322 may be directly connected to the first connected region 321 and the third region 330.

When the second body 200*b* is in the first position, the first connected region 321 may form a curved surface along the circumferential direction of the support 400.

When the second body 200*b* is in the first position, the first connected region 321 may form an outer surface of the flexible display 300 that is curved about a curvature center line CL1. When the second body 200*b* is in the first position, the curvature center line CL1 may be an imaginary straight line that forms a center of curvature of the first connected region 321, and may be parallel to the second direction.

When the second body 200*b* is in the first position, a cross section of the first connected region 321 may form a semicircular shape.

The curvature center line CL1 may coincide with the central axis 401 of support 400.

When the second body 200*b* is in the second position, the curvature center line CL1 may be a center of curvature of the second connected region 322 forming a curved surface.

An image may be displayed on the first connected region 321 and the main region 311.

A surface area of the main region 311 may be greater than a surface area of the first connected region 321.

When the second body 200*b* is in the first position, the second connected region 322 may form an outer surface of the flexible display 300 that is an opposite surface to the main region 311. That is, when the second body 200*b* is in the first position, and the main region 311 faces the third direction (Z direction), the second connected region 322 may face a direction opposite to the third direction (Z direction). An image may be displayed on the second connected region 322.

The second connected region 322 may have a constant cross section along the second direction. When the second body 200*b* is in the first position, the second connected region 322 may have a constant cross section along the first direction.

The flexible display 300 may be formed in such a manner that the main region 311, the first connected region 321, and the second connected region 322 are sequentially connected, and when the second body 200*b* is in the first position, the main region 311, the first connected region 321, and the second connected region 322 may form a U-shape as a whole.

In one embodiment of the present disclosure, when the second body 200*b* is in the first position, the second connected region 322 may form a curved surface as a whole. Here, a curvature of the second connected region 322 may be smaller than a curvature of the first connected region 321, and a radius of curvature of the second connected region 322 may be greater than a radius of curvature of the first connected region 321. When the second body 200*b* is in the first position, the radius of curvature of the second connected region 322 may be sufficiently greater than the radius of curvature of the first connected region 321. For example, when the radius of curvature of the first connected region 321 is "a," the radius of curvature of the second connected region 322 may be "10*a" or greater.

In another embodiment of the present disclosure, when the second body 200*b* is in the first position, the second connected region 322 may form a plane surface as a whole. In addition, the second connected region 322 may be parallel to the main region 311. Hereinafter, description will be made on the assumption that when the second body 200*b* is in the first position, the second connected region 322 forms a plane surface and is parallel to the main region 311.

The third region 330, on the opposite side to the main region 311, may extend from the second region 320. The third region 330 may be formed to extend from the second connected region 322 and may form an end portion of the flexible display 300.

In the flexible display 300, the main region 311, the second region 320, and the edge region 312 may be configured to display an image thereon, and the third region 330 may be configured not to display an image thereon. In the flexible display 300, the third region 330 may be an extended portion of a display substrate, and may form a dummy portion on which an image is not displayed.

The third region 330 may be formed separately from the flexible display 300 and then be coupled to the flexible display 300. Or, the third region 330 may be formed integrally with the flexible display 300 in the manufacturing process of the flexible display 300. The third region 330 may be formed as a substrate of the flexible display 300.

The third region 330 may be formed in the form of a plastic film, and may be flexibly curved.

The camera 121 may be fixed to a front surface of the body 200. The camera 121 may be fixed to a front surface of the first body 200a.

The camera 121 may be fixed to a rear surface of the body 200. The camera 121 may be coupled to the body 200 so as to face the direction opposite to the third direction (Z direction).

The camera 121 may be fixed to a rear surface of the first body 200a.

The camera 121 may be fixed to the body 200 at a portion away from the support 400. That is, if the support 400 is coupled to the body 200 at a lower portion of the flexible display device 1, the camera 121 may be coupled to the body 200 at an upper portion of the flexible display device 1. The camera 121 may be fixed to an edge of the first body 200a that is farthest from the support 400.

The flexible display device 1 may be provided whth two or more cameras 121. Two or more cameras 121 arranged in the first direction or the second direction.

The first body 200a may include a support plate 230.

The support plate 230 may be formed in a flat plate shape, and may be formed in a size the same as or similar to a size of the first region 310. The support plate 230 may be coupled in a form in which the first region 310 is laminated on an outside (front side) of the support plate 230, and the support plate 230 may support the first region 310 from inside the first region 310.

The first body 200a may include a first edge portion 205.

The first edge portion 205 may form any one edge of the flexible display device 1. The first edge portion 205 may form any one side of the flexible display device 1 having a rectangular shape.

The first edge portion 205 may form an upper side edge of the first body 200a.

The first edge portion 205 may be fixed to the first body 200a. The first edge portion 205 may be integrally formed with the first body 200a, or may be formed separately from the first body 200a and then fixed thereto.

The first edge portion 205 may generally be formed to extend in the second direction (Y direction).

At least a portion of the first edge portion 205 may have a constant cross section in the second direction (Y direction). An outer surface of the first edge portion 205 may form a convex curved surface, and a cross section of the first edge portion 205 may have, for example, a semicircular shape.

The first body 200a may include a first side edge portion 210 and a second side edge portion 220. The first side edge portion 210 and the second side edge portion 220 may form edges on both sides of the first body 200a, and may extend in the first direction. The first side edge portion 210 may be formed over the entire section of any one edge of the first body 200a, or may be formed over a partial section thereof. The second side edge portion 220 may be formed over the entire section of any one edge of the first body 200a, or may be formed over a partial section thereof.

The first side edge portion 210 and the second side edge portion 220 may be formed to be parallel to the first direction, and may have constant cross sections in the first direction. If the first side edge portion 210 forms a left side edge of the first body 200a, the second side edge portion 220 may form a right side edge of the first body 200a.

The second body 200b may include a second edge portion 206.

The second edge portion 206 may form an edge of the flexible display device 1 on the opposite side of the flexible display device 1 to the first edge portion 205. If the first edge portion 205 forms an upper side edge of the flexible display device 1, the second edge portion 206 may form a lower side edge of the flexible display device 1.

The second edge portion 206 may be disposed at an outer side of the support 400.

Between the second edge portion 206 and the support 400, a gap 207, which is relatively narrow, may be provided, and through the gap 207, the flexible display 300 may move, forming a curved surface (see FIGS. 6a and 6b).

In addition, a connection arm 373 of the support bar 370 may move through the gap 207.

The second edge portion 206 may be fixed to the second body 200b. The second edge portion 206 may be integrally formed with the second body 200b, or may be formed separately from the second body 200b and then fixed thereto.

The second edge portion 206 may generally be formed to extend in the second direction (Y direction).

At least a portion of the second edge portion 206 may have a constant cross section along the second direction (Y direction). An outer surface of the second edge portion 206 may form a convex curved surface, and a cross section of the second edge portion 206 may have a semicircular shape.

The second body 200b may include a third side edge portion 250 and a fourth side edge portion 260. The third side edge portion 250 and the fourth side edge portion 260 may form edges on both sides of the second body 200b, and may be formed to extend in the first direction. The third side edge portion 250 and the fourth side edge portion 260 may be formed to be parallel to the first direction, and may have constant cross sections along the first direction.

If the third side edge portion 250 forms a left side edge of the second body 200b, the fourth side edge portion 260 may form a right side edge of the second body 200b.

The third side edge portion 250 may be disposed to align with the first side edge portion 210, and may be disposed so as to come into close contact with the first side edge portion 210 or to be close thereto.

The third side edge portion 250 may be disposed at an outer side of the first side edge portion 210 or at an inner side of the first side edge portion 210.

The fourth side edge portion 260 may be disposed to align with the second side edge portion 220, and may be disposed so as to come into close contact with the second side edge portion 220 or to be close thereto.

The fourth side edge portion 260 may be disposed at an outer side of the second side edge portion 220 or at an inner side of the second side edge portion 220.

The flexible display device 1 may include a first back cover 270 and a second back cover 280.

The first back cover 270 may be formed in a shape of a plate that is substantially parallel to the first direction (X direction) and the second direction (Y direction). The first back cover 270 may be parallel to or substantially parallel to the main region 311.

The first back cover 270 may form a rear surface of the first body 200a. The first back cover 270 may be fixed to the first body 200a or may be detachably coupled to the first body 200a.

The first back cover 270 may be formed to be transparent or opaque.

A surface area of the first back cover 270 may correspond to a surface area of the main region 311, or may be equal to or greater than the surface area of the first region 310.

The second back cover 280 may be formed in a shape of a plate that is substantially parallel to the first direction (X direction) and the second direction (Y direction). The second back cover 280 may be parallel to or substantially parallel to the main region 311.

The second back cover 280 may form a rear surface of the second body 200b. The second back cover 280 may be fixed to the second body 200b or may be detachably coupled to the second body 200b.

The second back cover 280 may be formed to be transparent or opaque.

When the second body 200b is in the first position, a surface area of the second back cover 280 may correspond to a surface area of the second connected region 322, or may be equal to or greater than the surface area of the second connected region 322.

When the second back cover 280 is formed to be transparent, an image displayed on the second connected region 322 while the second body 200b is in the first position may be seen through the back cover 280.

The flexible display device 1 according to the embodiment of the present disclosure may include a plurality of support bars 370.

Each of the plurality of support bars 370 may be formed to extend generally in the second direction, and may be fixed to an inner surface of the second region 320. The plurality of support bars 370 may be directly fixed to the second region 320, or may be fixed thereto by means of a separate element.

Each of the plurality of support bars 370 may support the first connected region 321 or the second connected region 322 from inside the first connected region 321 or the second connected region 322, and the plurality of support bars 370 may be disposed one by one along the first connected region 321 and the second connected region 322.

Each of the plurality of support bars 370 may be disposed to be parallel to one another.

The plurality of support bars 370 may be made of a relatively hard material so as to support the flexible display 300. The plurality of support bars 370 may be made of plastic or metal.

The flexible display device 1 may further include an inner plate 350.

The inner plate 350 may be coupled in a form in which the inner plate 350 is stacked on an inner surface of the flexible display 300.

The inner plate 350 may be formed of a metal plate having elasticity. The inner plate 350 may include a superelastic metal. The inner plate 350 may be formed in a shape of a relatively thin plate. The inner plate 350 may have a thickness in the range of 0.05 mm to 0.2 mm, and may have a thickness of 0.1 mm.

According to one embodiment of the present disclosure, the inner plate 350 may be formed in the same or similar size and in the same or similar shape as the flexible display 300 such that the inner plate 350 is coupled to an entire inner surface of the flexible display 300.

According to another embodiment of the present disclosure, the inner plate 350 may be formed in the same or similar size and in the same or similar shape as the second region 320 such that the inner plate 350 is coupled to an inner surface of the second region 320.

The inner plate 350 may facilitate elastic deformation and elastic recovery of the flexible display 300.

When the inner plate 350 is provided in the flexible display device 1, the plurality of support bars 370 may be coupled to the flexible display 300 by means of the inner plate 350. That is, the inner plate 350 may be fixed to the inner surface of the flexible display 300, and the plurality of support bars 370 may be fixed to an inner surface of the inner plate 350.

The flexible display device 1 may further include a sliding plate 360.

The sliding plate 360 may generally be formed in a shape of a flat plate extending along the second direction. The sliding plate 360 may be made of metal, plastic, and the like.

The sliding plate 360 may be fixed to an end portion of the flexible display 300.

The sliding plate 360 may be fixed to the third region 330.

The sliding plate 360 may be coupled to the second body 200b such that the sliding plate 360 moves relative to the second body 200b along the first direction.

The sliding plate 360 may be slidably coupled to the second body 200b, and for this, both end portions of the sliding plate 360 may respectively be inserted into a first rear guide groove 252 and a second rear guide groove 262 and move therein.

The second body 200b may include a first movement guide groove 251 and a second movement guide groove 261.

The first movement guide groove 251 may be formed as a U-shaped groove, and may form a path into which a first support slider 371, which will be described below, is inserted and moves therein.

The second movement guide groove 261 may be formed as a U-shaped groove, and may form a path into which a second support slider 372, which will be described below, is inserted and moves therein.

The first movement guide groove 251 may include a first rear guide groove 252, a first front guide groove 253, and a first connection guide groove 254.

The second movement guide groove 261 may include a second rear guide groove 262, a second front guide groove 263, and a second connection guide groove 264.

The first rear guide groove 252 and the first front guide groove 253 may be formed in the third side edge portion 250, and the second rear guide groove 262 and the second front guide groove 263 may be formed in the fourth side edge portion 260.

In one embodiment of the present disclosure, the first connection guide groove 254 may be formed in the third side edge portion 250, and the second connection guide groove 264 may be formed in the fourth side edge portion 260. In another embodiment of the present disclosure, the first connection guide groove 254 and the second connection guide groove 264 may be formed in the second edge portion 206.

The first rear guide groove 252 may form a space inside the third side edge portion 250, may have a constant cross section along the first direction, and may be formed to be open inwards from a rear side of the third side edge portion 250.

The first front guide groove 253 may form a space inside the third side edge portion 250, may have a constant cross section along the first direction, and may be formed to be open inwards from a front side of the third side edge portion 250. The first front guide groove 253 may be symmetric with respect to the first rear guide groove 252.

The first connection guide groove 254 may form a semicircular-shaped space inside the second edge portion 206 of the second body 200b and may connect the first rear guide groove 252 to the first front guide groove 253.

The first rear guide groove 252, the first connection guide groove 254, and the first front guide groove 253 may form a U-shaped space together, and may form a movement path of the plurality of support bars 370 (in particular, the first support slider 371) to serve as a rail, which will be described below.

The second rear guide groove 262 may form a space inside the fourth side edge portion 260, may have a constant cross section along the first direction, and may be formed to be open inwards from a rear side the fourth side edge portion 260.

The second front guide groove 263 may form a space inside the fourth side edge portion 260, may have a constant cross section along the first direction, and may be formed to be open inwards from a front side of the fourth side edge portion 260. The second front guide groove 263 may be symmetric with respect to the second rear guide groove 262.

The second connection guide groove 264 may form a semicircular-shaped space inside the second edge portion 206 of the second body 200b and may connect the second rear guide groove 262 to the second front guide groove 263.

The second rear guide groove 262, the second connection guide groove 264, and the second front guide groove 263 may form a U-shaped space together, and may form a movement path of the plurality of support bars 370 (in particular, the second support slider 372) to serve as a rail, which will be described below.

The first rear guide groove 252, the first front guide groove 253, and the first connection guide groove 254 may respectively be symmetric to the second rear guide groove 262, the second front guide groove 263, and the second connection guide groove 264.

Each of the plurality of support bars 370 may be formed to extend in the second direction (Y direction) as a whole.

Each of the plurality of support bars 370 may include a first support slider 371, a second support slider 372, and a connection arm 373.

The first support slider 371 may form an end portion of the plurality of support bars 370 at one side thereof.

The first support slider 371 may be inserted into the first rear guide groove 252, the first connection guide groove 254, and the first front guide groove 253, so as to move along the space (path) formed by the first rear guide groove 252, the first connection guide groove 254, and the first front guide groove 253.

The second support slider 372 may form the other end portion of the plurality of support bars 370 in the opposite side to the first support slider 371.

The second support slider 372 may be inserted into the second rear guide groove 262, the second connection guide groove 264, and the second front guide groove 263, so as to move along the space (path) formed by the second rear guide groove 262, the second connection guide groove 264, and the second front guide groove 263.

The connection arm 373 may have a constant cross section along the second direction (Y direction).

The connection arm 373 may connect the first support slider 371 to the second support slider 372, may support an inner surface of the flexible display 300, and may assist in maintaining the first connected region 321 and the second connected region 322 in a stable plane surface or curved surface.

The connection arm 373 may be formed in such a shape that a cross section thereof is a trapezoid (i.e. in a shape in which a width of the connection arm 373 becomes increasingly smaller away from a rear surface of the flexible display 300).

The plurality of support bars 370 may have a predetermined thickness such that when the plurality of support bars 370, which are successively arranged, form a plane parallel to the first region 310, the second region 320, which is supported by the plurality of support bars 370, are maintained stable like the first region 310.

A front surface of the connection arm 373 and a front surface of the support plate 230 may form a single plane.

The second region 320 may be maintained in a stable state by means of the plurality of support bars 370. In particular, when the second region 320 is formed as a touch screen to receive a touch input, the second region 320 may be stably supported by the plurality of support bars 370.

Flexible Display Device with the Second Coupling Structure

FIG. 6a is a perspective view illustrating the first state of the flexible display device 1, FIG. 6b is a perspective view illustrating the second state in which the flexible display device 1 illustrated in FIG. 6a is deformed, and FIG. 6c is a perspective view of the flexible display device of FIG. 6b when viewed from another direction.

FIG. 7a is a cross-sectional view taken along line B-B' of FIG. 6a. FIG. 7b is a cross-sectional view illustrating a state in which the flexible display device of FIG. 7a is deformed. In FIGS. 7a and 7b, a hinge device 600 is conceptually simply displayed.

In the flexible display device 1 with the second coupling structure, the first body 200a and the second body 200b are rotatably (M2) coupled to each other.

In the flexible display device 1 with the second coupling structure according to one embodiment of the present invention, the flexible display 300 includes the first region 310 and the second region 320. The first region 310 and the second region 320 may be formed as described above. As described above, the first region 310 includes the main region 311 and the edge region 312. However, the second region 320 includes not a first connection region 321 and a second connection region 322, but the second region 320 includes a third connection region 323 and a fourth connection region 324.

The third connection region 323 and the fourth connection region 324 are formed to display an image on a surface thereof.

The first region 310 may be a part coupled to the first body 200a, the fourth connection region 324 may be a part coupled to the second body 200b, and the third connection region 323 may be a part between the first region 310 and the fourth connection region 324.

In one embodiment of the present invention, when the flexible display 300 varies between the first state and the second state, the deformation may be mainly performed in the third connection region 323.

In addition, in one embodiment of the present invention, when the flexible display 300 varies between the first state and the second state, the deformation may be performed only in the third connection region 323.

In addition, in one embodiment of the present invention, when the flexible display 300 is deformed from the second state to the first state, the first region 310 and the fourth connection region 324 may be disposed parallel to each other and may face each other.

In the flexible display device 1 according to one embodiment of the present invention, the first body 200a and the second body 200b are rotatably (M2) coupled to each other, thereby enabling the first body 200a and the second body 200b to be folded and unfolded. In the folded state, the flexible display 300 may be in the first state, and in the unfolded state, the flexible display 300 may be in the second state.

The first body 200a and the second body 200b may be folded outside the flexible display 300 and overlap with each other such that the flexible display 300 is not exposed to the outside in the first state in which the flexible display 300 is folded.

FIGS. 6a and 7a are views corresponding to a folding state (the first state) in which the flexible display 300 is folded inward, and FIGS. 6b and 7b correspond to an unfolding state (the second state) in which the flexible display 300 is unfolded.

Hereinafter, as illustrated in FIGS. 6a and 7a, the 'folding state' refers to a state in which the main region 311 and the fourth connection region 324 are folded parallel to each other, and a state in which the first body 200a and the second body 200b are folded parallel to each other, and, as illustrated in FIGS. 6b and 7b, the 'unfolded state' refers to a state in which the main region 311 and the fourth connection region 324 are unfolded to form the same plane, and a state in which the first body 200a and the second body 200b are unfolded to form the same plane.

The flexible display 300 is disposed inside the first body 200a and the second body 200b by the folding. As such, the flexible display device 1 of the present example may be an in-foldable device.

According to the inward folding structure, the flexible display 300 may not be exposed to the outside during the folding, and the first body 200a and the second body 200b may shield the flexible display 300.

When the flexible display device 1 according to one embodiment of the present invention is folded, the first body 200a and the second body 200b may overlap and get in close contact with each other, and the third connection region 323 between the first region 310 and the fourth connection region 324 of the flexible display 300 may be bent by forming the curved surface.

The third connection region 323 of the flexible display 300 may be disposed inside the first body 200a and the second body 200b during the folding of the flexible display device 1, and during the folding, the third connection region 323, the third connection region 323 may be disposed on a first accommodation part 204a provided in the first body 200a and a second accommodation part 204b provided in the second body 200b.

The first accommodation portion 204a is an inner space of the first body 200a, and the second accommodation portion 204b is a space inside the second body 200b.

The flexible display device 1 includes the hinge device 600.

The hinge device 600 connects the first body 200a to the second body 200b. The hinge device 600 is rotatably coupled to the first body 200a, and is also rotatably coupled to the second body 200b.

The hinge device 600 may be rotatably coupled (fixed) to the first body 200a on a first rotation axis 602, and rotatably coupled (fixed) to the second body 200b on the second rotation axis 603.

The first rotation axis 602 and the second rotation axis 603 may be parallel to the second direction Y.

The hinge device 600 may include a first rotation link 610 and a second rotation link 620.

The first rotation link 610 and the second rotation link 620 may be rotatably coupled to each other with respect to a central rotation axis 601.

The first rotation link 610 may be rotatably coupled to the first body 200a on the first rotation axis 602, and the second rotation link 620 may be rotatably coupled to the second body 200b on the second rotation axis 603.

The central rotation axis 601, the first rotation axis 602, and the second rotation axis 603 may be parallel to each other and may be parallel to the second direction.

FIG. 8a is a perspective view illustrating a part of the first body 200a in a cross-sectional shape in the flexible display device 1 according to one embodiment. The shape of the cross-section of FIG. 8a may be a part of the cross-section viewed from A-A' of FIG. 2a, or may be a part of the cross-section viewed from C-C' of FIG. 6b.

FIG. 8b is a view illustrating a part of the deco frame 240 in the flexible display device 1 of FIG. 8a.

FIG. 9a is a perspective view illustrating a part of the first body 200a in a cross-sectional shape in the flexible display device 1 according to one embodiment. FIG. 9a corresponds to FIG. 8a in position and direction of the cross-section.

FIG. 9b is a diagram illustrating a part of the deco frame 240 in the flexible display device 1 of FIG. 9a.

FIG. 10 is a perspective view illustrating a speaker module 500 illustrated in FIGS. 8a and 9a, and FIG. 11 is a cross-sectional view of the speaker module 500 of FIG. 10.

FIG. 12 is a cross-sectional view illustrating the first body 200a in the flexible display device 1 according to one embodiment, and FIG. 13 is a cross-sectional view illustrating the speaker module 500 of FIG. 12.

The flexible display device 1 includes the speaker module 500 and the deco frame 240. The flexible display device 1 may include an inner channel 201, a filter 202, and an outer channel 203.

A first sound radiation portion 246 and a second sound radiation portion 247 are provided around the deco frame 240, and the first sound radiation portion 246 and the second sound radiation portion 247 are holes formed such that sound generated inside the first body 200a (especially sound generated by the speaker module 500) is radiated to the outside of the first body 200a. That is, the first sound radiation portion 246 and the second sound radiation portion 247 form a final opening through which sound is radiated to the outside of the first body 200a.

The deco frame 240 will be described in detail below.

The speaker module 500 includes a speaker housing 520 and a speaker 510. As described above, the speaker 510 forms one configuration of a sound output unit 152.

The speaker 510 according to one embodiment of the present invention may have the same structure as a conventional speaker. The speaker 510 may include a magnet, a voice coil, and a vibration plate 511. As the magnet and the voice coil react with each other, the voice coil reciprocates, and the vibration plate 511 coupled to the voice coil is moved (vibrated) along to generate sound.

In the drawings for describing one embodiment of the present invention, only an outward appearance of the speaker 510 is schematically illustrated.

In the speaker 510, the vibration plate 511 may be coupled to the first body 200a such that a surface thereof is parallel to the first direction and the second direction. That is, the speaker 510 is mounted inside the speaker housing 520 in a way that a surface formed by the vibration plate 511 of the speaker 510 is perpendicular to the third direction, and the vibration plate 511 of the speaker 510 is coupled to the first body 200*a* to be parallel to the main area 311 of the first region 310.

Accordingly, while preventing the thickness of the first body 200*a* (the size of the first body 200*a* in the third direction) from increasing, the area of the vibration plate 511 of the speaker 510 can be relatively increased, and sound quality of the speaker 510 can be secured.

In one embodiment, the vibration plate 511 of the speaker 510 may be placed such that a surface thereof faces the third direction (see FIG. 8*a* and FIG. 9*a*).

In another embodiment, the vibration plate 511 of the speaker 510 may be placed such that the surface thereof faces in a direction opposite to the third direction (see FIG. 12).

The speaker housing 520 includes a speaker duct 521 having a space therein in which the speaker 510 can be mounted and capable of moving the sound (sound wave) generated from the speaker 510 to the outside.

The speaker housing 520 is fixed to the inside of the first body 200*a*.

The speaker housing 520 may have a form in which the other components are sealed except the speaker duct 521. That is, the sound generated from the speaker 510 may be mainly or completely radiated to the outside of the speaker housing 520 through the speaker duct 521.

With the speaker 510 mounted inside the speaker housing 520, a front space 522 is provided in the front of the speaker 510 (a part where the vibration plate 511 of the speaker (510) is located), and a rear space 523 is provided in the rear of the speaker 510 (a side opposite to the part where the vibration plate 511 of the speaker 510 is located).

The sound generated from the vibration plate 511 of the speaker 510 is radiated to the outside of the speaker housing 520 through the front space 522 and the speaker duct 521, and the rear space 523 acts as a resonator of the speaker 510. The rear space 523 can be provided to reinforce a low sound of the sound generated from the speaker 510.

The speaker duct 521 is formed in the form of a duct and may be used as a passage through which the sound inside the speaker housing 520 is radiated to the outside of the speaker housing 520.

The speaker duct 521 may be opened in a direction opposite to the first direction. That is, the speaker duct 521 may be formed such that the direction from an inner end (an inner opening 521*a*) to an outer end (an outer opening 521*b*) is substantially opposite to the first direction.

Accordingly, the thickness of the first body 200*a* may be prevented from increasing by the speaker duct 521, and the sound generated from the speaker 510 can be properly transmitted to the outside of the speaker housing 520.

In addition, the speaker duct 521 may have a cross-sectional area that increases from the inner end (the inner opening 521*a*) to the outer end (the outer opening 521*b*). Accordingly, if the sum of the cross-sectional areas of the inner end (the inner opening 521*a*) of the speaker duct 521 is A1, and the sum of the cross-sectional areas of the outer end (the outer opening 521*b*) of the speaker duct 521 is A2, A2 is larger than A1.

Accordingly, the sound generated from the speaker 510 may be radially spread and transmitted to the outside of the speaker housing 520, and the sound quality of the speaker 510 can be improved.

The inner channel 201 is an inner space of the first body 200*a*. The inner channel 201 may form an inner space of the first edge portion 205 directly inside the first edge portion 205.

The inner channel 201 forms a passage through which the sound generated (transmitted) from the speaker 510 moves in the third direction. The inner channel 201 has a predetermined length in the third direction and a predetermined length in the second direction. The length in the third direction and the length in the second direction of the inner channel 201 may be longer than the length in the first direction of the inner channel 201.

The outer end (the outer opening 521*b*) of the speaker duct 521 is disposed directly adjacent to the inner channel 201, and the inner channel 201 communicates with the inside of the speaker duct 521.

In addition, the inner channel 201 communicates with the first sound radiation portion 246 and the second sound radiation portion 247.

The filter 202 may be elongated along the second direction. That is, a longitudinal direction of the filter 202 may be parallel to the second direction. The filter 202 may be formed in the form of a thin film or a thin plate, and the surface formed by the filter 202 may be formed parallel to the first and second directions.

The filter 202 is disposed between the deco frame 240 and the inner channel 201.

In the filter 202, a sound radiation hole 202*a*, which is a hole penetrated in the third direction Z, is formed. A plurality of sound radiation holes 202*a* are provided along the second direction Y and are spaced apart from each other.

The diameter of each sound radiation hole 202*a* may be equal to or smaller than the width of the first sound radiation portion 246.

The filter 202 can prevent foreign substances outside the first body 200*a* from flowing into an inner space of the first body 200*a*, and simultaneously allow the sound generated from the speaker 510 to be radiated to the outside of the first body 200*a*.

The outer channel 203 is an inner space of the first body 200*a*. The outer channel 203 is a space between the deco frame 240 and the filter 202. The outer channel 203 forms a passage through which the sound (sound wave) of the speaker 510 moves and communicates directly with the first sound radiation portion 246 and the second sound radiation portion 247.

The outer channel 203 may form an inner space of the first edge portion 205 directly inside the first edge portion 205.

The inner channel 201 and the outer channel 203 are distinguished from each other based on the filter 202.

The outer channel 203 forms a passage through which the sound generated (transmitted) from the speaker 510 moves in the third direction, and also forms a passage through which the sound moves in the first direction. The outer channel 203 has a predetermined length in the third direction and also has a predetermined length in the first direction and the second direction. The length of the outer channel 203 in the second direction may be longer than the length in the first direction and the length in the third direction.

The deco frame 240 is fixedly coupled to the first body 200*a*.

The deco frame 240 may form an edge part of the first body 200*a*.

The deco frame 240 is coupled to the first body 200*a* along the edge of the first region 310, and when viewed in the third direction or in the direction opposite to the third direction, the deco frame 240 partially overlaps with the first region 310.

The deco frame 240 may be divided into a first deco frame 241, a second deco frame 242, and a third deco frame 243.

The first deco frame 241 is parallel to the second direction. That is, the longitudinal direction of the first deco frame 241 is parallel to the second direction. The first deco frame 241 may be coupled to the first body 200a directly adjacent to the first edge portion.

The first deco frame 241 is coupled to the edge region 312 in a form in which an end (an end in a direction opposite to the first direction) of the edge region 312 enters the inside of the first deco frame 241. That is, when viewed from the front in the third direction, an end corner of the edge region 312 is covered by the first deco frame 241 and is not visible.

When viewed from the front in the third direction, the first deco frame 241 may not overlap with the main region 311.

At least a part of an inner side of the first deco frame 241 is spaced apart from an outer side of the edge region 312, and a gap (space) between the first deco frame 241 and the edge region 312 forms the second sound radiation portion 247.

The second deco frame 242 and the third deco frame 243 extend from opposite ends of the first deco frame 241, respectively, and are parallel to the first direction. When the second deco frame 242 forms a left side of the deco frame 240, the third deco frame 243 forms a right side of the deco frame 240. The second deco frame 242 and the third deco frame 243 may be symmetrical with respect to the first deco frame 241.

The second deco frame 242 may be coupled along one edge of the main area 311, and the third deco frame 243 may be coupled along the other edge of the main area 311.

The second deco frame 242 is coupled to the main area 311 in a form in which the end (the front end in a direction opposite to the second direction) of the main area 311 enters the inside of the second deco frame 242. That is, when viewed from the front in the third direction, at least a part of an end corner of the main region 311 is covered by the second deco frame 242 and is not visible.

The third deco frame 243 is coupled to the main region 311 in a form in which the end (a front end in the second direction) of the main region 311 enters the inside of the second deco frame 242. That is, when viewed from the front in the third direction, at least a part of the end corner of the main region 311 is covered by the third deco frame 243 is not visible.

An inner surface of the second deco frame 242 and an inner surface of the third deco frame 243 may be in close contact with an outer surface of the edge of the first region 310. Specifically, the inner surface of the second deco frame 242 and the inner surface of the third deco frame 243 may be in close contact with an outer surface of a edge of the main region 311.

The first sound radiation portion 246 and the second sound radiation portion 247 are formed on opposite sides of the first deco frame 241, respectively.

The first sound radiation portion 246 forms an outlet (hole) through which the sound (sound wave) of the speaker 510 is transmitted to the outside of the first body 200a, and is formed on an opposite side of the first region 310 based on the deco frame 240.

The first sound radiation portion 246 may be formed between the first edge portion 205 and the first deco frame 241. The first edge portion 205 and the first deco frame 241 may be provided such that some corners are in close contact with each other, or other corners are spaced apart from each other, and the first sound radiation portion 246 may be provided in a part where the first edge portion 205 and the first deco frame 241 are spaced apart from each other.

The width of the first sound radiation portion 246 (a gap between the first edge portion 205 and the first deco frame 241) may be constant along the second direction, and the width of the first sound radiation portion 246 may be about 0.3 mm.

When viewed from the third direction, the first sound radiation portion 246 and the sound radiation hole 202a overlap with each other.

The second sound radiation portion 247 forms the outlet (hole) through which the sound (sound wave) of the speaker 510 is transmitted to the outside of the first body 200a.

The second sound radiation portion 247 is formed between the first region 310 and the deco frame 240. Specifically, the second sound radiation portion 247 is formed between the deco frame 240 and the edge region 312.

The width of the second sound radiation portion 247 (a gap between the first deco frame 241 and the edge region 312) may be constant along the second direction, and the width of the second sound radiation portion 247 may be about 0.15 mm.

In the second direction, a length d1 of the second sound radiation portion 247 may be at least ⅓ of a length d2 of the first region 310.

In the second direction, the length d1 of the second sound radiation portion 247 may be longer than the length of the first sound radiation portion 246. In the second direction, the length d1 of the second sound radiation portion 247 may be about twice the length of the first sound radiation portion 246.

The sound (sound wave) generated from the vibration plate 511 of the speaker 510 by the operation of the speaker 510 passes through the speaker duct 521, the inner channel 201, the sound radiation hole 202a of the filter 2022, and the outer channel 203, and then is radiated to the outside of the first body 200a through the first sound radiation portion 246 and the second sound radiation portion 247.

In one embodiment, an intermediate channel 248 may be formed in the deco frame 240.

The intermediate channel 248 is a hole penetrating the deco frame 240 inward and outward.

The intermediate channel 248 forms an outlet through which the sound (sound wave) of the speaker 510 is radiated to the outside of the first body 200a. That is, the intermediate channel 248 may be another sound radiation unit together with the first sound radiation portion 246 and the second sound radiation portion 247, and accordingly, the intermediate channel 248 may be a third sound radiation unit.

The intermediate channel 248 may be inclined in the first direction toward the third direction. Accordingly, the sound passing through the sound radiation hole 202a of the filter 202 may be naturally transmitted to the intermediate channel 248, and the path of the sound moving through the intermediate channel 248 may be naturally formed.

A sound radiation through the intermediate channel 248 may be effectively performed.

The intermediate channel 248 may be elongated along the second direction.

In the second direction, the length of the intermediate channel 248 may be the same as or similar to the length of the first sound radiation portion 246. Alternatively, in the second direction, the length of the intermediate channel 248 may be the same as or similar to the length of the second sound radiation portion 247.

FIGS. 14*a* and 14*b* are exploded perspective views of the deco frame 240 and the filter 202 according to one embodiment, respectively. Parts enlarged in FIGS. 14*a* and 14*b* are illustrated in a state in which the deco frame 240 is coupled to the flexible display device 1.

The deco frame 240 may include a contact portion 244 and a communication portion 245.

The contact portion 244 protrudes inward from an inner surface of the deco frame 240. Specifically, the contact portion 244 protrudes inward from an inner surface of the first deco frame 241. A plurality of contact portions 244 may be provided, and each of the contact portions 244 may be spaced apart from each other.

The contact portion 244 may come into contact with the filter 202 between the first sound radiation portion 246 and the second sound radiation portion 247.

The communication portion 245 is a passage penetrating the contact portion 244 in the first direction such that the first sound radiation portion 246 and the second sound radiation portion 247 communicate with each other.

Therefore, as the contact portion 244 is in contact with the filter 202, a stable coupling between the deco frame 240 and the filter 202 is performed, and specifically, the filter 202 is stably coupled inside the first body 200*a*. In addition, the sound generated from the speaker 510 may be radiated to the second sound radiation portion 247 through the communication portion 245.

FIGS. 15*a* and 15*b* are views illustrating results of measuring sound performance of the speaker module 500 according to one embodiment of the present invention. FIGS. 15*a* and 15*b* show the results of the sound pressure level (SPL) of the speaker 510 according to the frequency region.

When the sound generated from the speaker 510 is radiated to the outside, that is, when the sound generated from the speaker 510 finally deviates from the first body 200*a*, the smaller hole (final opening) allows the lower sound quality of the speaker 510, and the larger hole (final opening) allows the better sound quality of the speaker 510.

For the sound of the speaker 510 to be ideally transmitted, the sound generated from the vibration plate 511 of the speaker 510 has to be radiated forward from the front of the vibration plate 511, and in this case, a final opening corresponding to at least 100% of the area of the vibration plate 511 of the speaker 510 has to be formed.

A graph of ① in FIG. 15*a* shows the intensity of sound pressure for each frequency when sound proceeds forward from the front of the vibration plate 511 of the speaker 510. That is, the graph of ① is a graph when the sound of the speaker 510 is most ideally transmitted.

A graph of ② of FIGS. 15*a* and 15*b* show the intensity of sound pressure for each frequency when the second sound radiation portion 247 is not provided and only the first sound radiation portion 246 is provided, unlike the present invention.

When the graph of ② is compared with the graph of ①, it can show that the sound pressure characteristics for each frequency are uneven, and the sound pressure decreases in a high frequency area where a secondary resonance occurs.

This may be because the sound generated from the vibration plate 511 of the speaker 510 cannot proceed directly ahead and proceeds through a space inside the flexible display device 1, and the area of the final opening formed by the first sound radiation portion 246 is very small as compared to the area of the vibration plate 511 of the speaker 510.

In addition, as described above, in the speaker duct 521, the cross-sectional area of the outer end (outer opening) is formed larger than the cross-sectional area of the inner end (inner opening), and this may be because the cross-sectional area of the final opening formed by the first sound radiation portion 246 is smaller than that of the outer end (outer opening) of the speaker duct 521.

As in the present invention, when the first sound radiation portion 246 and the second sound radiation portion 247 are provided, the first sound radiation portion 246 and the second sound radiation portion 247 may form a final opening in which sound is radiated together, and the area of the final opening may be relatively large.

A graph of ③ in FIGS. 15*a* and 15*b* show the intensity of sound pressure for each frequency when the first sound radiation portion 246 and the second sound radiation portion 247 are provided as in this invention.

When the graph of ③ is compared with the graph of ②, it can show shows similar sound pressure characteristics in the low frequency area, but shows an increase in sound pressure in the high frequency area where the secondary resonance occurs. That is, as compared with the graph of ②, the graph of ③ shows that the performance of the speaker 510 is improved (improved to the level of 10 to 20 dB) in the high frequency area (around 10 KHz).

As described above, according to the flexible display device 1 according to the embodiment of the present invention, since the first sound radiation portion 246 and the second sound radiation portion 247 are formed on opposite sides of the deco frame 240, respectively, the area of the final opening where the sound of the speaker 510 is radiated to the outside can be expanded. Accordingly, the sound of the speaker 510 can be radiated to the outside through the first sound radiation portion 246 and the second sound radiation portion 247, thereby improving the sound quality of the speaker 510.

In addition, the second sound radiation portion 247 is a space (gap) formed between the edge region 312 and the deco frame 240 of the first region 310, and at least a part of the deco frame 240 overlaps with the edge region 312 in the third direction. Therefore, it is possible to prevent or minimize external exposure of the second sound radiation portion 247, prevent external aesthetic damage, and prevent a possibility of internal penetration of foreign substances.

As shown in FIGS. 9*a* and 9*b*, when the intermediate channel 248 is formed with the first sound radiation portion 246 and the second sound radiation portion 247, the sound formed in the speaker 510 is radiated to the outside through the first sound radiation portion 246, the second sound radiation portion 247, and the intermediate channel 248, and accordingly, the final opening may be further expanded, thereby more improving the sound quality of the speaker 510.

While the specific exemplary embodiments of the present invention have been described and illustrated, it is obvious to those skilled in the art that the present invention is not limited to the aforementioned exemplary embodiments, and may be variously changed and modified without departing from the spirit and the scope of the present invention. Therefore, the modified examples or variants should not be appreciated individually from the technical spirit or prospect of the present invention, and the modified examples belong to the claims of the present invention.

INDUSTRIAL APPLICABILITY

The industrial applicability of the flexible display device according to the embodiment of the present invention is obvious in that the sound quality of the speaker can be improved by transmitting the sound (sound wave) of the speaker to the outside of the first body through the first sound radiation portion and the second sound radiation portion, and the second sound radiation portion can be prevented from being exposed from the outside.

The invention claimed is:

1. A flexible display device, comprising:
a first body;
a second body configured to move between a first position and a second position relative to the first body;
a flexible display including a first region fixed to the first body and a second region extending from the first region and coupled to the second body and deformed when the second body moves between the first position and the second position; and
a speaker disposed inside the first body and configured to output a sound,
wherein the first body includes:
a deco frame coupled along an edge of the first region;
a first sound radiation portion forming an outlet through which the sound (sound wave) of the speaker is radiated to the outside of the first body, and formed on the opposite side of the first region based on the deco frame; and
a second sound radiation portion forming an outlet through which the sound (sound wave) of the speaker is radiated to the outside of the first body, and formed between the first region and the deco frame,
wherein the first region includes:
a main region connected to the second region in a first direction and forming a plane parallel to the first direction and a second direction perpendicular to the first direction; and
an edge region extending from the main region in a direction opposite to the first direction to form an end part of the first region, wherein at least a part of the edge region overlaps with the deco frame in a third direction perpendicular to the first direction and the second direction,
wherein the deco frame includes:
a first deco frame parallel to the second direction; and
a second deco frame and a third deco frame extending from opposite ends of the first deco frame and parallel to the first direction, respectively, and
wherein the first sound radiation portion and the second sound radiation portion are formed on opposite sides of the first deco frame, respectively.

2. The flexible display device of claim 1, wherein the edge region forms a convex curved surface.

3. The flexible display device of claim 1, wherein at least a part of the second region is parallel to a surface formed by the first region when the second body is in the first position, and
at least a part of the second region forms the same plane as a surface formed by the first region when the second body is in the second position.

4. The flexible display device of claim 2, wherein the first body includes:

an inner channel forming a passage through which the sound (sound wave) of the speaker moves along the third direction, as an inner space of the first body, and communicating with the first sound radiation portion and the second sound radiation portion; and
a filter disposed parallel to the second direction, disposed between the deco frame and the inner channel, and provided with a plurality of sound radiation holes penetrated in the third direction, along the second direction.

5. The flexible display device of claim 4, wherein when viewed in the third direction, the first sound radiation portion overlaps with the sound radiation hole.

6. The flexible display device of claim 4, wherein the first body comprises
an outer channel configured to be a space between the deco frame and the filter, which forms a passage through which the sound (sound wave) of the speaker moves, and communicating with the first sound radiation portion and the second sound radiation portion.

7. The flexible display device of claim 1, wherein an inner surface of the second deco frame and an inner surface of the third deco frame are in close contact with the first region.

8. The flexible display device of claim 2, wherein the deco frame is a hole penetrating the deco frame inward and outward, and includes an intermediate channel inclined in the first direction toward the third direction and formed in the second direction.

9. The flexible display device of claim 2, wherein the first body includes a filter disposed parallel to the second direction, disposed inside the deco frame, and provided with a plurality of sound radiation holes penetrated in the third direction, along the second direction, and
the deco frame includes:
a contact portion protruding inward from the inner surface of the deco frame and coming into contact with the filter between the first sound radiation portion and the second sound radiation portion; and
a communication portion that is a passage penetrating the contact portion in the first direction such that the first sound radiation portion communicates with the second radiation unit.

10. The flexible display device of claim 2, wherein the first body includes a speaker housing fixed in the inside of the first body, having the speaker mounted therein such that a vibration plate of the speaker is perpendicular to the third direction, and provided with a speaker duct opened in a direction opposite to the first direction so as to radiate the sound (sound wave) of the speaker.

11. The flexible display device of claim 10, wherein A2, which is the sum of the cross-sectional areas of an outer end of the speaker duct, is larger than A1, which the sum of the cross-sectional areas of an inner end of the speaker duct.

12. The flexible display device of claim 1, wherein the second body is configured to move between the first position and the second position parallel to the first direction
the second body further includes a support formed along the second direction perpendicular to the first direction, and
the second region includes a first connection region extending from the first region, and a second connection region extending from the first connection region, and
when the second body is in the first position, the first connection region is curved by forming a curved surface around the support, and the second connection region is parallel to the first region, and when the second body is in the second position, the first connection region is the same plane as the first region, and a part of the second connection region is curved by forming a curved surface around the support body.

13. The flexible display device of claim 1, wherein the first body and the second body are rotatably coupled to each other,
when the second body is in the first position, the first body and the second body are folded together, and
when the second body is in the second position, the first body and the second body are unfolded together.

14. The flexible display device of claim 13, further comprising:
a hinge device configured to connect the first body to the second body, rotatably coupled to the first body, and rotatably coupled to the second body,
wherein when the second body is in the first position, the flexible display is folded between the first body and the second body.

15. A flexible display device, comprising:
a first body;
a second body configured to move between a first position and a second position relative to the first body;
a flexible display including a first region fixed to the first body and a second region extending from the first region and coupled to the second body; and
a speaker module fixed in an inner part of the first body, and including a speaker configured to output a sound and a speaker housing having the speaker mounted therein and provided with a speaker duct opened in the direction opposite to a first direction so as to radiate a sound (sound wave) of the speaker,
wherein the first region includes:
a main region forming a plane parallel to the first direction and a second direction perpendicular to the first direction; and
an edge region extending from the main region in a direction opposite to the first direction and having a constant cross-section along the second direction,
the second region is configured such that when the second body moves to the second position, an area forming the same plane as the main region is increased, and
the first body includes:
a deco frame coupled along an edge of the first region; and
a second sound radiation portion configured to form an outlet through which the sound (sound wave) of the speaker passing through the speaker duct is radiated to the outside of the first body, and formed between the edge region and the deco frame; and
a first sound radiation portion configured to form an outlet through which the sound (sound wave) of the speaker passing through the speaker duct is radiated to the outside of the first body, and formed opposite to the second sound radiation portion based on the deco frame,
wherein the first body includes:
an inner channel configured to form a passage through which the sound (sound wave) of the speaker passing through the speaker duct moves along a third direction perpendicular to the first direction and the second direction, as an inner space of the first body, and communicating with the first sound radiation portion and the second sound radiation portion; and
a filter disposed parallel to the second direction, disposed between the deco frame and the inner channel, and including a plurality of sound radiation holes penetrated in the third direction by a diameter equal to or smaller than the width of the first sound radiation portion and arranged along the second direction.

16. The flexible display device of claim 15, wherein the edge region forms a convex curved surface to the outside.

17. The flexible display device of claim 16, wherein in the second direction, the length of the second sound radiation portion is ⅓ or more of the length of the first region.

18. The flexible display device of claim 15, further comprising: a plurality of support bars elongated in a direction parallel to the second direction and fixed to an inner surface of the second region,
wherein the support bar includes:
a first support slider forming one end of the support bar;
a second support slider forming one end thereof on the opposite side of the first support slider;
a connection arm configured to connect the first support slider and the second support slider and support the second region,
wherein the second body includes:
a first movement guide groove formed in a U-shaped groove to form a path through which the first support slider is inserted and moved; and
a second movement guide groove formed in a U-shaped groove to form a path through which the second support slider is inserted and moved.

* * * * *